(12) United States Patent
Irie et al.

(10) Patent No.: US 11,915,511 B2
(45) Date of Patent: Feb. 27, 2024

(54) INFORMATION PROCESSING SYSTEM, INFORMATION PROCESSING METHOD, AND PROGRAM

(71) Applicant: NEC Corporation, Tokyo (JP)

(72) Inventors: Fumi Irie, Tokyo (JP); Misuzu Shingai, Tokyo (JP); Honami Kokubo, Tokyo (JP); Takeo Tamura, Tokyo (JP); Koui Norimatsu, Tokyo (JP); Kenichi Izumo, Tokyo (JP); Yoshitaka Yoshimura, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 18/012,824

(22) PCT Filed: Jul. 1, 2020

(86) PCT No.: PCT/JP2020/025821
§ 371 (c)(1),
(2) Date: Dec. 23, 2022

(87) PCT Pub. No.: WO2022/003863
PCT Pub. Date: Jan. 6, 2022

(65) Prior Publication Data
US 2023/0186678 A1    Jun. 15, 2023

(51) Int. Cl.
*G06V 40/12* (2022.01)
*G06V 40/18* (2022.01)

(52) U.S. Cl.
CPC .......... *G06V 40/1394* (2022.01); *G06V 40/18* (2022.01)

(58) Field of Classification Search
CPC ...... G06V 40/1394; G06V 40/18; G07C 9/00; G07C 9/257; G07C 9/27; G06Q 50/265; G06F 21/32
See application file for complete search history.

(56) References Cited

U.S. PATENT DOCUMENTS

2012/0075442 A1    3/2012  Vujic
2019/0392129 A1   12/2019  Tsai et al.

FOREIGN PATENT DOCUMENTS

| JP | 2007-172078 A | 7/2007 |
| JP | 2007-247346 A | 9/2007 |
| JP | 2007-280250 A | 10/2007 |
| JP | 2008-021332 A | 1/2008 |
| JP | 2012-528379 A | 11/2012 |
| JP | 2018-109935 A | 7/2018 |
| JP | 2018-165941 A | 10/2018 |
| JP | 2019-079264 A | 5/2019 |
| WO | 2017/212967 A1 | 12/2017 |

(Continued)

OTHER PUBLICATIONS

International Search Report for PCT Application No. PCT/JP2020/025821, dated Sep. 29, 2020.

(Continued)

*Primary Examiner* — Abhishek Sarma
(74) *Attorney, Agent, or Firm* — Sughrue Mion, PLLC

(57) ABSTRACT

An information processing system is configured to acquire noncontact information indicating at least one of noncontact fingerprint information and iris information of an authentication subject. Subsequently, the information processing system is configured to acquire biological information used for a collation of the authentication subject, which is recorded in advance and associated with the noncontact information.

8 Claims, 12 Drawing Sheets

(56) References Cited

FOREIGN PATENT DOCUMENTS

WO     2019/102619 A1    5/2019
WO     2020086824 A1    4/2020

OTHER PUBLICATIONS

Extended European Search Report for EP Application No. 20943245.9, dated Jul. 20, 2023.
JP Office Action for JP Application No. 2022-532920, dated Nov. 21, 2023 with English Translation.

INFORMATION PROCESSING SYSTEM, INFORMATION PROCESSING METHOD, AND PROGRAM

This application is a National Stage Entry of PCT/JP2020/025821 filed on Jul. 1, 2020, the contents of all of which are incorporated herein by reference, in their entirety.

TECHNICAL FIELD

This disclosure relates to an information processing system, an information processing method, and a program.

BACKGROUND ART

Recently, authentication technologies have been used in various places. For example, an authentication system configured to perform an authentication process using an authentication technology is designed to acquire fingerprint information of authentication subjects. The related technology is disclosed in Patent Document 1.

Patent Document 1 discloses a technology of performing fingerprint collation of any person who may enter into or depart from any country in immigration control. An apparatus to take fingerprints used for the technology of Patent Document 1 is designed to read fingerprints of fingers of authentication subjects put on a predetermined platform using an optical technology or the like. An information processing system using fingerprints is designed to store biological information such as fingerprints of authentication subjects registered in advance.

CITATION LIST

Patent Literature Document

Patent Document 1: Japanese Patent Application Publication No. 2008-21332

SUMMARY OF INVENTION

Technical Problem

This disclosure aims to improve the technology as disclosed by Patent Document 1.

Solution to Problem

To solve the aforementioned problem, an information processing system includes a noncontact information acquisition means configured to acquire noncontact information indicating at least one of noncontact fingerprint information and iris information of an authentication subject, and a collation information acquisition means configured to acquire biological information used for a collation of the authentication subject, which is recorded in advance and associated with the noncontact information.

An information processing method is configured to acquire noncontact information indicating at least one of noncontact fingerprint information and iris information of an authentication subject and to acquire biological information used for a collation of the authentication subject, which is recorded in advance and associated with the noncontact information.

A program causes a computer of an information processing system to implement a noncontact information acquisition means configured to acquire noncontact information indicating at least one of noncontact fingerprint information and iris information of an authentication subject, and a collation information acquisition means configured to acquire biological information used for a collation of the authentication subject, which is recorded in advance and associated with the noncontact information.

DESCRIPTION OF EXEMPLARY EMBODIMENTS

This disclosure aims to improve the technology as disclosed by Patent Document 1.

In this connection, the related technology may require an existing authentication process using the pre-recorded information to be performed without bringing a reader of biological information of an information processing system in contact with a certain range of body parts used to take biological information from authentication subjects in a hygiene perspective.

Figure 1:
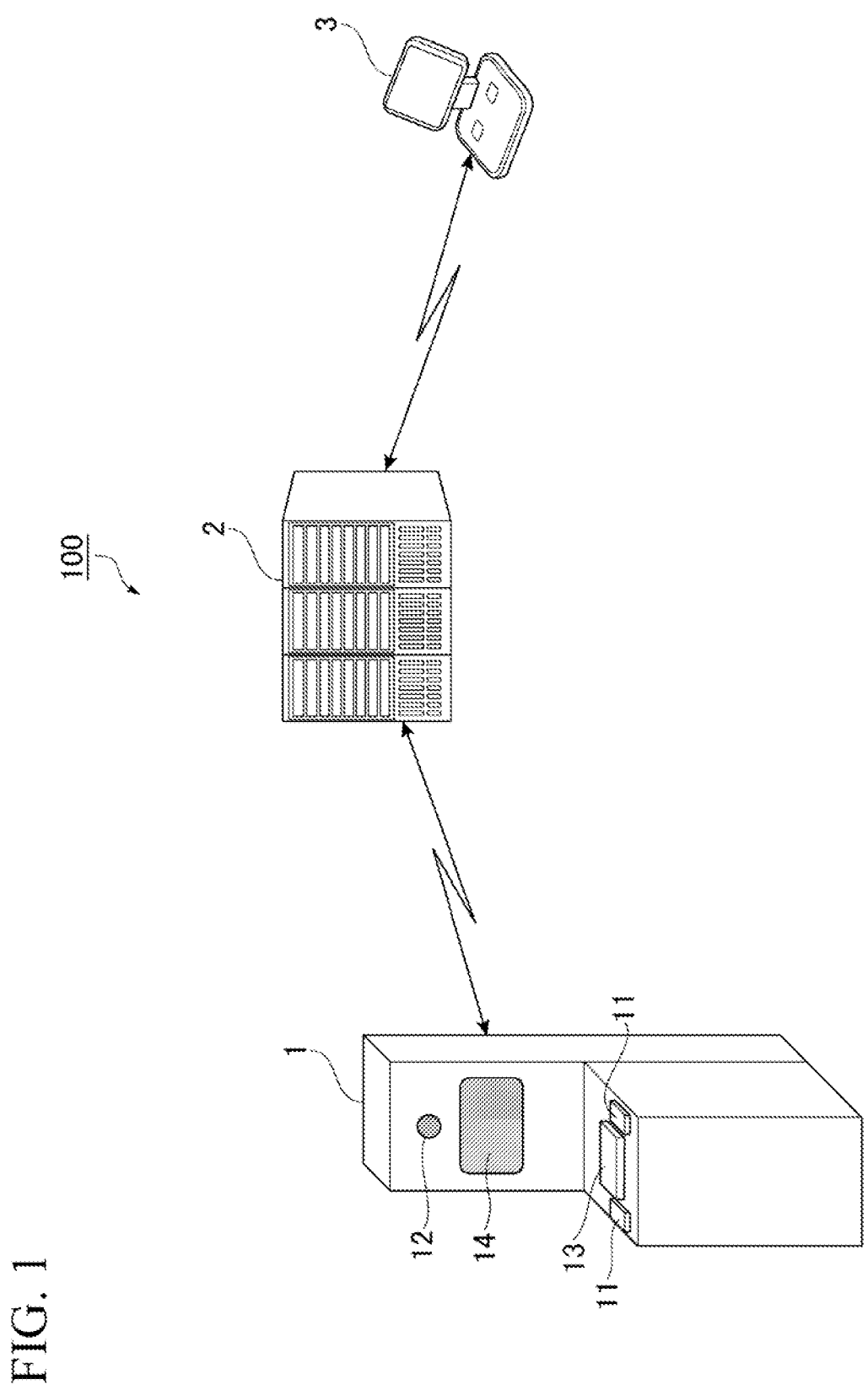
FIG. 1 is a schematic diagram showing an overview of an information processing system according to this disclosure.

FIG. 1 is a first diagram showing an overview of an information processing system according to the present exemplary embodiment.

As shown in FIG. 1, an information processing system 100 includes at least an inspection-gate apparatus 1, an authentication apparatus 2, and a registration apparatus 3.

The inspection-gate apparatus 1 is connected to the authentication apparatus 2 through communication networks. The registration apparatus 3 is connected to the authentication apparatus 2 through communication networks.

For example, the inspection-gate apparatus 1 is installed in an immigration-procedure area of an airport. The inspection-gate apparatus 1 is configured to manage the entry into or departure from an airport of any person having a nationality corresponding to a country of the airport and any person having another nationality corresponding to another country, thus authenticating those persons for immigration control. The inspection-gate apparatus 1 includes hardware elements such as a fingerprint reading device 11, a camera 12, a passport-information-reading device 13, and a display 14.

The fingerprint reading device 11 is configured to read fingerprints in a non-contact manner. For example, the fingerprint reading device 11 is an optical scanner configured to read fingerprint information of a finger of a user without having the user touched the fingerprint reading device 11. Alternatively, the fingerprint reading device 11 may have a similar function of a camera to obtain fingerprint information from the captured image. For the purpose of taking fingerprints from both a left finger and a right finger, it is possible to provide the inspection-gate apparatus 1 with two fingerprint reading devices 11. For example, the fingerprint reading device 11 may have two fingerprint readers to take fingerprints of two index fingers of both hands. Alternatively, the fingerprint reading device 11 may have fingerprint readers each configured to take fingerprints from two or more fingers, thus concurrently taking fingerprints of four fingers. The fingerprint reading device 11 may have a function to detect position information of a finger (e.g., an index finger, a middle finger) while taking its fingerprint, thus registering the fingerprint and the position information to be associated with each other.

The camera 12 is configured to capture an image of an eye and/or a face of a person subjected to authentication. The inspection-gate apparatus 1 is configured to acquire facial feature information from the facial image. In addition, the inspection-gate apparatus 1 is configured to generate iris information from the image of an eye. The inspection-gate apparatus 1 can be equipped with an iris reading device dedicated to acquire iris information differently from iris information taken by the camera 12, thus generating the iris information based on an iris image taken by the iris reading device. The iris information is information produced by digitizing iris features based on the iris information. In this connection, it is possible to generate the facial feature information and the iris information using known techniques.

The passport-information-reading device 13 is configured to read the information on the face of a passport containing personal information as well as the information stored on a storage device embedded in a passport. For example, the passport-information-reading device 13 may optically acquire the information on the face of a passport. In addition, the passport-information-reading device 13 may have a function to read information from the circuitry having a storage such as an IC chip embedded in a passport or a function to acquire information stored on a storage device embedded in a passport using the technique of RFID (Radio Frequency Identification) or the like.

The display 14 is configured to display information such as an authentication result. Under the control of the inspection-gate apparatus 1, the display 14 is configured to display various types of guidance information such as a guidance for reading fingerprints, a guidance for taking images of faces and/or irises, a guidance for acquiring passport information, and a guidance for guiding users to move towards a predetermined position. The guidance information for reading fingerprints may display the position of the fingerprint reading device 11, a guidance how to place fingers on the fingerprint reading device 11, and other information. The guidance information for taking images of faces and/or irises may display a guidance to a stand position, the height of a face, a distance from the camera 12, and other information. The guidance information for acquiring passport information may display the information regarding a page of a passport to be read, guidance to provide passport information, and other information.

The authentication apparatus 2 is configured to store a registrant table. The registrant table may store passport information, fingerprint impression information, and noncontact fingerprint information, which were registered by a user using a registration apparatus in the past, to be associated with each other. The passport information may include passport types, issuance countries, passport numbers, surnames, names, nationalities, birthdates, genders, issuance dates, expiration dates in validity terms, and other information. The fingerprint impression information and the non-contact fingerprint information recorded on the registrant table can be registered by the registration apparatus 3.

The authentication apparatus 2 may further store a watchlist table. For example, the watchlist table may include a blacklist configured to record information of any person having criminal records and/or any dangerous person provided by other countries. In this connection, the information of any person having criminal records and/or any dangerous person may be fingerprint information, facial feature information, and passport information of those persons. As the information of any person having criminal records and/or any dangerous person, the watchlist may record fingerprint information, facial feature information, and passport information of those persons to be associated with each other.

The registration apparatus 3 is an apparatus operated by a user to register user's own passport information, fingerprint impression information, and noncontact fingerprint information in advance. The registration apparatus 3 can be set up at an immigration administration or an airport. Alternatively, a mobile terminal such as a smartphone held by a user may serve as the registration apparatus 3. The registration apparatus 3 has various functions serving as a first fingerprint reading device configured to read fingerprint information of a fingerprint of a finger touched on a contact surface, a second fingerprint reading device configured to read fingerprint information in a noncontact manner, and a passport-information-reading device configured to read passport information in a similar manner as the inspection-gate apparatus 1. A user of the inspection-gate apparatus 1 may operate the registration apparatus 3 to register passport information, fingerprint impression information, and non-contact fingerprint information. The registration apparatus 3 is configured to transmit passport information, fingerprint impression information, and noncontact fingerprint information to the authentication apparatus 2, thus instructing registration of those information on the registrant table. Accordingly, the authentication apparatus 2 can register passport information, fingerprint impression information, and noncontact fingerprint information to be associated with each other on the registrant table.

Figure 2:
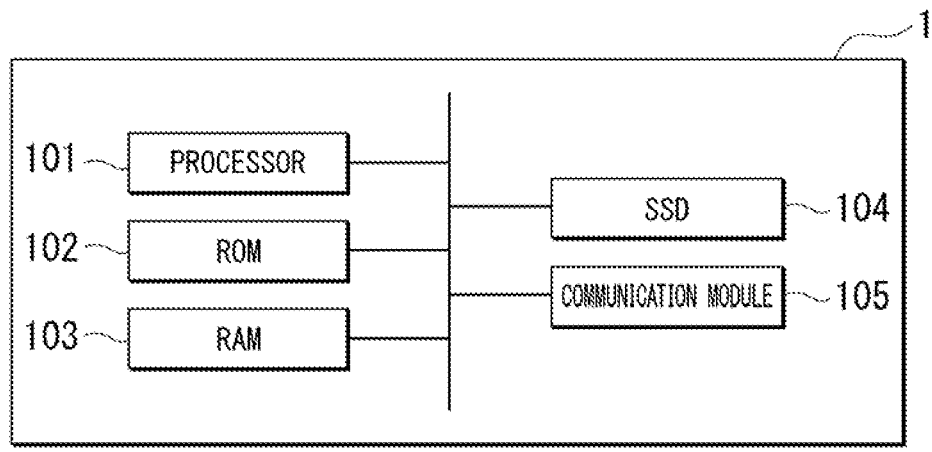
FIG. 2 is a block diagram showing a hardware configuration of an inspection-gate apparatus according to this disclosure.

FIG. 2 is a block diagram showing a hardware configuration of an inspection-gate apparatus according to the present exemplary embodiment.

As shown in FIG. 2, the inspection-gate apparatus 1 is a computer including various hardware elements such as a processor (e.g., CPU (Central Processing Unit), GPU (Graphics Processing Unit), FPGA (Field Programmable Gate Array), DSP (Digital Signal Processor), ASIC (Application-Specific Integrated Circuit)) 101, a ROM (Read-Only Memory) 102, a RAM (Random-Access Memory) 103, a SSD 104, and a communication module 105. In this connection, the authentication apparatus 2 and the registration apparatus 3 are computers having similar hardware configurations.

First Exemplary Embodiment

Figure 3:
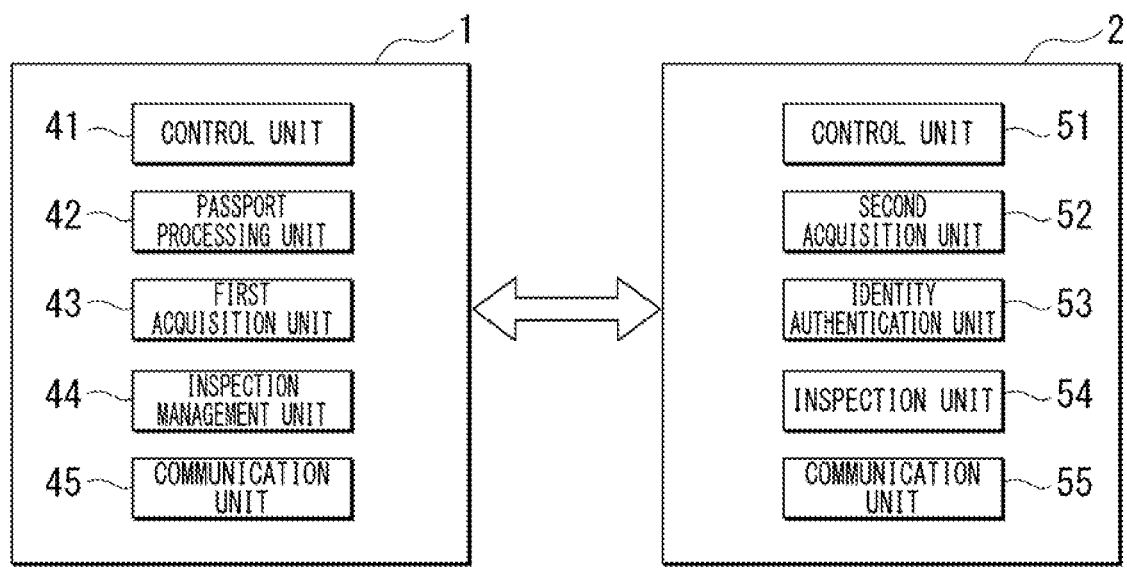
FIG. 3 is a block diagram showing a functional configuration of an authentication apparatus and a functional configuration of the inspection-gate apparatus according to the first exemplary embodiment of this disclosure.

FIG. 3 is a block diagram showing a functional configuration of an authentication apparatus and a functional configuration of an inspection-gate apparatus according to the first exemplary embodiment.

The inspection-gate apparatus 1 executes inspection-management programs to perform various functions such as a control unit 41, a passport processing unit 42, a first acquisition unit 43 (e.g., a noncontact information acquiring means), an inspection management unit 44, and a communication unit 45.

The control unit 41 is configured to control the inspection-gate apparatus 1.

The passport processing unit 42 is configured to acquire passport information and to determine whether a passport has been revoked.

The first acquisition unit 43 is configured to acquire noncontact fingerprint information (or noncontact information) to be authenticated.

The inspection management unit 44 is configured to carry out an inspection process relating to immigrations according to an identity authentication and the result of an inspection process (or watchlist collation) at the authentication apparatus 2.

The communication unit 46 is configured to communicate with the authentication apparatus 2.

The authentication apparatus 2 executes authentication programs to perform various functions such as a control unit 51, a second acquisition unit 52 (e.g., a collation information acquiring means), an identity authentication unit 53, an inspection unit 54, and a communication unit 55.

The control unit 51 is configured to control the authentication apparatus 2.

The second acquisition unit 52 is configured to acquire biological information used for collation with an authentication subject, which is recorded in advance and associated with noncontact information.

The identity authentication unit 53 is configured to carry out an identity authentication process. The identity authentication unit 53 is one aspect of an authentication means for performing authentication to verify an authentication subject using noncontact information produced by a noncontact device upon detecting at least biological information. The identify authentication unit 53 is configured to check consistency to establish an identity of a person who presents a passport as an authentication subject using the inspection-gate apparatus 1. For example, the identity authentication unit 53 may calculate a score representing consistency between noncontact information of an authentication subject and passport information of an authentication subject, whereby it is possible to establish the identify of a person who presents a passport as an authentication subject using the inspection-gate apparatus 1 when the score representing consistency is equal to or above a threshold value.

The inspection unit 54 is configured to perform an inspection process (e.g., watchlist collation). The inspection unit 54 is one aspect of a collation means for making collation of registered information related to an authentication subject using at least biological information produced by a noncontact device.

The communication unit 55 is configured to communicate with the inspection-gate apparatus 1 or the registration apparatus 3.

Figure 4:
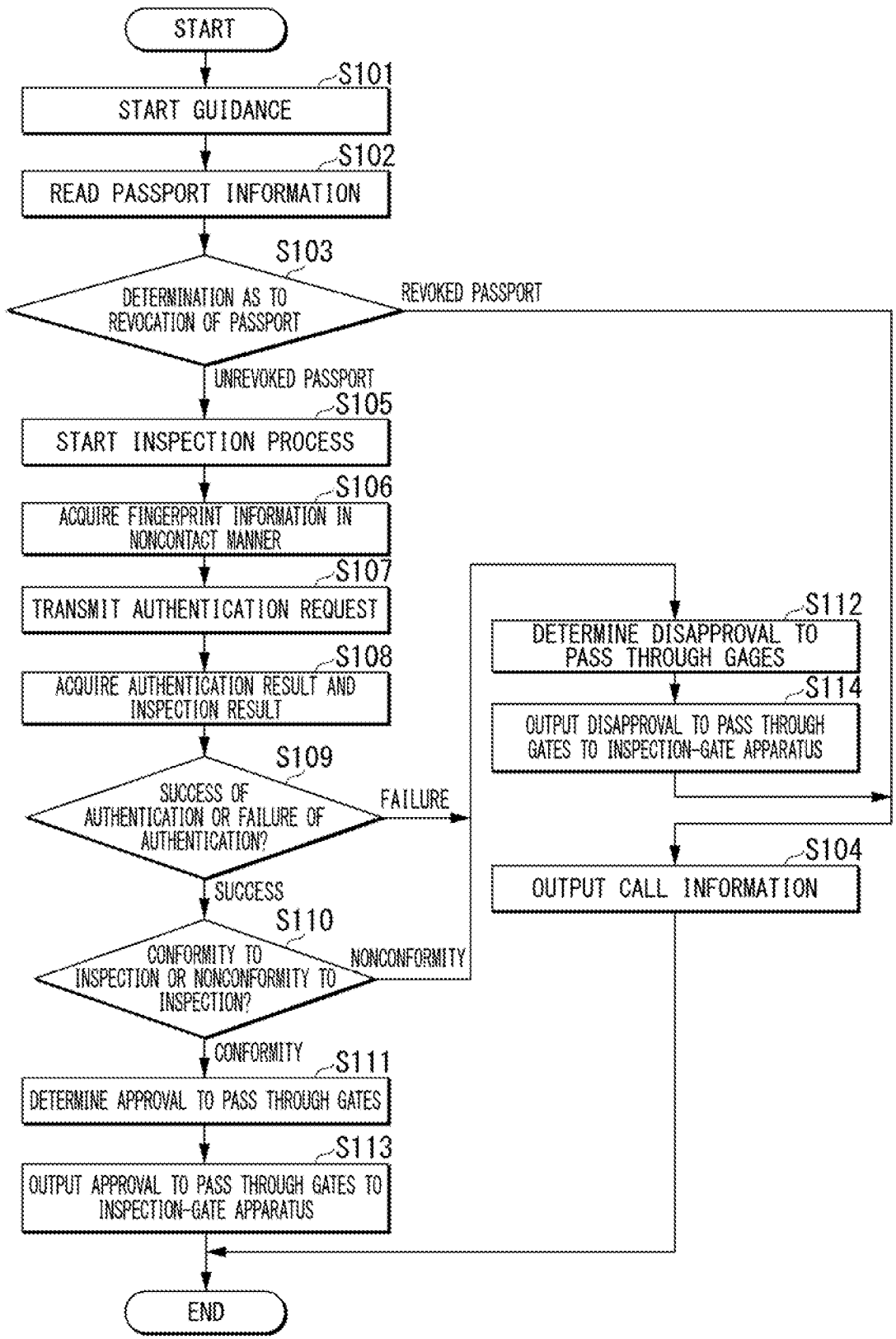
FIG. 4 is a flowchart showing a flow of processing of the inspection-gate apparatus according to the first exemplary embodiment of this disclosure.

FIG. 4 is a flowchart showing a flow of processing of an inspection-gate apparatus according to the first exemplary embodiment.

Figure 5:
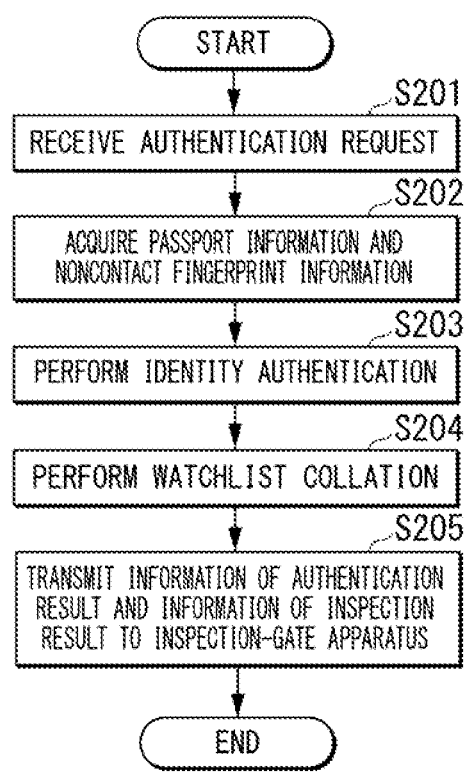
FIG. 5 is a flowchart showing a flow of processing of the authentication apparatus according to the first exemplary embodiment of this disclosure.

FIG. 5 is a flowchart showing a flow of processing of an authentication apparatus according to the first exemplary embodiment.

Next, the details of processing of an information processing system according to the first exemplary embodiment will be described below.

For example, a user in an attempt to enter into a certain country through the inspection-gate apparatus 1 may approaches the inspection-gate apparatus 1 installed in the neighborhood of an entry gate. The control unit 41 of the inspection-gate apparatus 1 repeatedly acquires images captured by the camera 12 so as to detect whether the user approaches the inspection-gate apparatus 1 based on the position and the size of a person's face reflected in captured images, thus starting a guidance (step S101). Alternatively, the control unit 41 of the inspection-gate apparatus 1 may start a guidance upon detecting whether the user approaches the inspection-gate apparatus 1 based on sensing information acquired from a human-detecting sensor such as an infrared sensor. The control unit 41 outputs guidance information used for acquiring passport information on the display 14.

The guidance information displays instructions for a user to open a page of a passport indicating user's attribute information and to put the opened page of a passport at a predetermined position of the passport-information-reading device 13 or to hold the opened page of a passport over a predetermined position of the passport-information-reading device 13. The user watching the guidance information may open a predetermined page of a passport so as to put the predetermined page of a passport at a predetermined position of the passport-information-reading device 13 such that the passport-information-reading device 13 can read the predetermined page of a passport.

The passport processing unit 42 outputs to the passport-information-reading device 13 an instruction to capture an image of a passport at a predetermined timing to be determined using a sensor upon detecting an event in which a passport is put on at a predetermined position. This makes it possible for the passport-information-reading device 13 to capture an image of a page describing user's attribute information. The page may include the attribute information as the information related to a user's passport (e.g., a passport type, an issuance country, a passport number, a surname, a name, a nationality, a birth date, a gender, an issuance date, an expiration date of a validity term).

The passport processing unit 42 instructs the passport-information-reading device 13 to read information (passport information) of a storage device embedded in a passport at the predetermined timing. The passport-information-reading device 13 reads passport information from an IC chip embedded in a passport (step S102). Similarly, the passport information may include various pieces of information such as a passport type, an issuance country, a passport number a surname, a name, a nationality, a birthdate, a gender, an issuance date, and an expiration date of a validity term. In addition, the passport information may read biological information such as user's facial feature information.

The passport processing unit 42 temporarily store the captured image of a passport and the passport information. The passport processing unit 42 determines whether a passport has been revoked using at least one of the captured image of a passport and the passport information (step S103). The passport processing unit 42 determines revocation of a passport using known techniques. The passport processing unit 42 outputs to the inspection management unit 44 the information as to whether or not a user's passport is a revoked passport based on the passport information. When a user's passport is determined as a revoked passport, the inspection management unit 44 may output call information to a terminal managed by an immigration inspector (step S104). For the purpose of making a decision as to revocation of a passport, the inspection-gate apparatus 1 may send an inquiry to the authentication apparatus 2 by transmitting the captured image of a passport and the passport information to the authentication apparatus 2, and therefore the authentication apparatus 2 may perform a similar process of an inspection-gate apparatus 1 using the captured image of a passport and the passport information.

The inspection management unit 44 starts an inspection process when a passport is not determined as a revoked passport (step S105). The inspection management unit 44 instructs the first acquisition unit 43 to starts its process. Subsequently, the first acquisition unit 43 instructs the fingerprint reading device 11 to start its operation. In addition, the first acquisition unit 43 displays on the display 14 a guidance image for guiding a timing to start acquiring a fingerprint. The guidance image displays various pieces of information such as the position of the fingerprint reading device 11 and the position of a finger to acquire its fingerprint by the fingerprint reading device 11. A user may move his/her finger to a predetermined position according to the guidance information.

Subsequently, the fingerprint reading device 11 acquire fingerprint information in a noncontact manner at a predetermined timing upon detecting a user's finger being disposed at the predetermined position with a sensor or the like (step S106). The fingerprint reading device 11 generates noncontact fingerprint information. The fingerprint reading device 11 generates and outputs the noncontact fingerprint information to the first acquisition unit 43. The first acquisition unit 43 acquires the noncontact fingerprint information. The first acquisition unit 43 outputs the noncontact fingerprint information to the inspection management unit 44. The inspection management unit 44 transmits to the authentication apparatus 2 an authentication request including the noncontact fingerprint information and the passport information acquired by the passport processing unit 42 (step S107).

The authentication apparatus 2 receives an authentication request (step S201). The authentication apparatus 2 retrieves the passport information and the noncontact fingerprint information included in the authentication request (step S202). The authentication apparatus 2 performs an identify authentication based on the passport information and the noncontact fingerprint information (step S203). Specifically, the identity authentication unit 53 of the authentication apparatus 2 determines whether an association between the passport information and the noncontact fingerprint information is recorded on the registrant table. The identity authentication unit 53 determines a success of the identity authentication when the noncontact fingerprint information and the passport information retrieved from the authentication request are registered on the registrant table in an associative manner. In contrast, the identity authentication unit 53 determines a failure of the identity authentication when the noncontact fingerprint information and the passport information retrieved from the authentication request are not registered on the registrant table in an associative manner. The authentication apparatus 2 may perform an identity authentication using other processes. For example, the identity authentication unit 53 may retrieve the passport information and the noncontact fingerprint information from the authentication request so as to acquire the fingerprint impression information and the facial feature information which are associated with the noncontact fingerprint information and recorded on the registrant table in advance. Subsequently, the identity authentication unit 53 may perform the identity authentication using the fingerprint impression information and the facial feature information.

Upon determining that the identity authentication is made successfully, the authentication apparatus 2 performs collation with the watchlist (step S204). The collation of the watchlist is a process to determine whether the information of a user identified via the identity authentication is recorded on the watchlist table. Specifically, the second acquisition unit 52 of the authentication apparatus 2 acquires the fingerprint impression information which is associated with the noncontact fingerprint information retrieved from the authentication request and registered on the registrant table. The second acquisition unit 52 outputs the fingerprint impression information to the inspection unit 54. The inspection unit 54 performs collation of the fingerprint impression information and the fingerprint information registered on the watchlist table according to a 1:n collation algorithm, thus determining whether the fingerprint information of a person indicated by the fingerprint impression information is included in the watchlist table. Upon determining that the fingerprint information of a person indicated by the fingerprint impression information is included in the watchlist table, the inspection unit 54 generates conformity information representing conformity to inspection requirements. Upon determining that the fingerprint information of a person indicated by the fingerprint impression information is not included in the watchlist table, the inspection unit 54 generates nonconformity information representing nonconformity to inspection requirements. The communication unit 54 of the authentication apparatus 2 transmits to the inspection-gate apparatus 1 the information representing a result of authentication via an identity authentication (e.g., a success of authentication or a failure of authentication) and another information representing a result of inspection via a watchlist collation (e.g., conformity information representing conformity to inspection requirements or nonconformity information representing nonconformity to inspection requirements) (step S205). As one aspect of the watchlist collation, it is possible to provide a blacklist collation for determining whether the user information is recorded on a blacklist table.

The inspection management unit 44 of the inspection-gate apparatus 1 acquires the result of authentication and the result of inspection (step S108). The inspection management unit 44 determines whether the result of authentication indicates a success of authentication or a failure of authentication (step S109). Upon determining a success of authentication, the inspection management unit 44 determines whether the result of inspection indicates conformity to inspection requirements or nonconformity to inspection requirements (step S110). Upon determining conformity to inspection requirements, the inspection management unit 44 indicates approval to pass through gates (step S111). Upon determining a failure of authentication as the result of authentication or upon determining nonconformity to inspection requirements as the result of inspection, the inspection management unit 44 indicates disapproval to pass through gates (step S112). Upon getting an approval to pass through gates, for example, the inspection management unit 44 outputs the approval to pass through gates to gate equipment (step S113). Accordingly, the gate equipment may open gates and allows a user to pass through gates. Upon getting a disapproval to pass through gates, the inspection management apparatus 44 outputs the disapproval to pass through gates to the gate equipment (step S114). Accordingly, the gate equipment may close gates so as to prevent a user from passing through gates. Upon getting a disapproval to pass through gates, the inspection management unit 44 may output call information to a terminal managed by an immigration inspector.

According to the aforementioned processes, the information processing system 100 identifies the user's fingerprint impression information from the user's noncontact fingerprint information so as to perform a watchlist collation using the fingerprint impression information. Therefore, the information processing system 100 is configured to perform a watchlist collation without acquiring the fingerprint impression information from a user at the inspection-gate apparatus 1. Since the information processing system 100 is designed to perform a watchlist collation using the fingerprint impression information instead of the noncontact fingerprint information, it is possible to achieve a highly-accurate watchlist collation by identifying the fingerprint impression information although the noncontact fingerprint information having a smaller amount of information than the fingerprint impression information is obtained from a user. Since the inspection-gate apparatus 1 is not configured to directly acquire the fingerprint impression information from a user, it is possible to reduce a chance of multiple users repeatedly touching a predetermined part of the same apparatus for the purpose of obtaining their fingerprint impression information. Thus, it is possible to reduce a degree of transmitting viruses from one person to another person. According to the aforementioned processes, users may not need to directly touch the inspection-gate apparatus 1 with their hands, and therefore it is possible to reduce a degree of transmitting viruses via users' hands. According to the aforementioned processes, it is possible to reduce a degree of virus transmission and to perform a collation using a small amount of information such as noncontact fingerprint information and a large amount of information such as fingerprint impression information.

The aforementioned watchlist collation is realized by acquiring the fingerprint impression information associated with the noncontact fingerprint information and registered on the registrant table, performing collation of the fingerprint impression information and the fingerprint information registered on the watchlist table via a 1:n collation algorithm, and determining whether the fingerprint information of a person indicated by the fingerprint impression information is included in the watchlist table. In a process to be performed when the fingerprint impression information associated with the noncontact fingerprint information is not registered on the registrant table, the inspection unit 54 may directly use the noncontact fingerprint information so as to determine whether the fingerprint information of a person indicated by the fingerprint impression information is included in the watchlist table. That is, the inspection unit 54 may perform a collation according to an 1:n collation algorithm using a fingerprint feature quantity indicated by the noncontact fingerprint information and a fingerprint feature quantity of the fingerprint information (or the fingerprint impression information) registered on the watchlist table, thus determining whether the fingerprint information of a person indicated by the fingerprint impression information is included in the watchlist table. Similarly, other exemplary embodiments described below may be configured to perform a watchlist collation.

Second Exemplary Embodiment

The first exemplary embodiment refers to an example of the inspection-gate apparatus 1 configured to acquire the user's noncontact fingerprint information at the inspection-gate apparatus 1, while the second exemplary embodiment refers to another example of the inspection-gate apparatus 1 configured to acquire the user's iris information. The functional configurations of the inspection-gate apparatus 1 and the authentication apparatus 2 according to the second exemplary embodiment have the same functional configurations shown in FIG. 3.

The registration apparatus 3 is an apparatus used for a user of the inspection-gate apparatus 1 to register the passport information, the fingerprint impression information, the noncontact fingerprint information, and the iris information by himself/herself in advance. The registration apparatus 3 is set up at an immigration administration or an airport. The registration apparatus 3 has various functions to implement a first fingerprint reading device configured to read fingerprint information of a finger touching the contact face thereof, a second fingerprint reading device configured to read fingerprint information of a finger in a noncontact manner, an iris-information-acquiring device configured to acquire the user's iris information, and a passport-information-acquiring device configured to acquire passport information in a similar manner of the inspection-gate apparatus 1. A user in an attempt to use the inspection-gate apparatus 1 may register the passport information, the fingerprint impression information, the noncontact fingerprint information, and the iris information with the registration apparatus 3. The registration apparatus 3 transmits to the authentication apparatus 2 the passport information, the fingerprint impression information, the noncontact fingerprint information, and the iris information, thus instructing the authentication apparatus 3 to record the information on the registrant table. Accordingly, the authentication apparatus 2 may register the passport information, the fingerprint impression information, the noncontact fingerprint information, and the iris information to be associated with each other on the registrant table.

Figure 6:
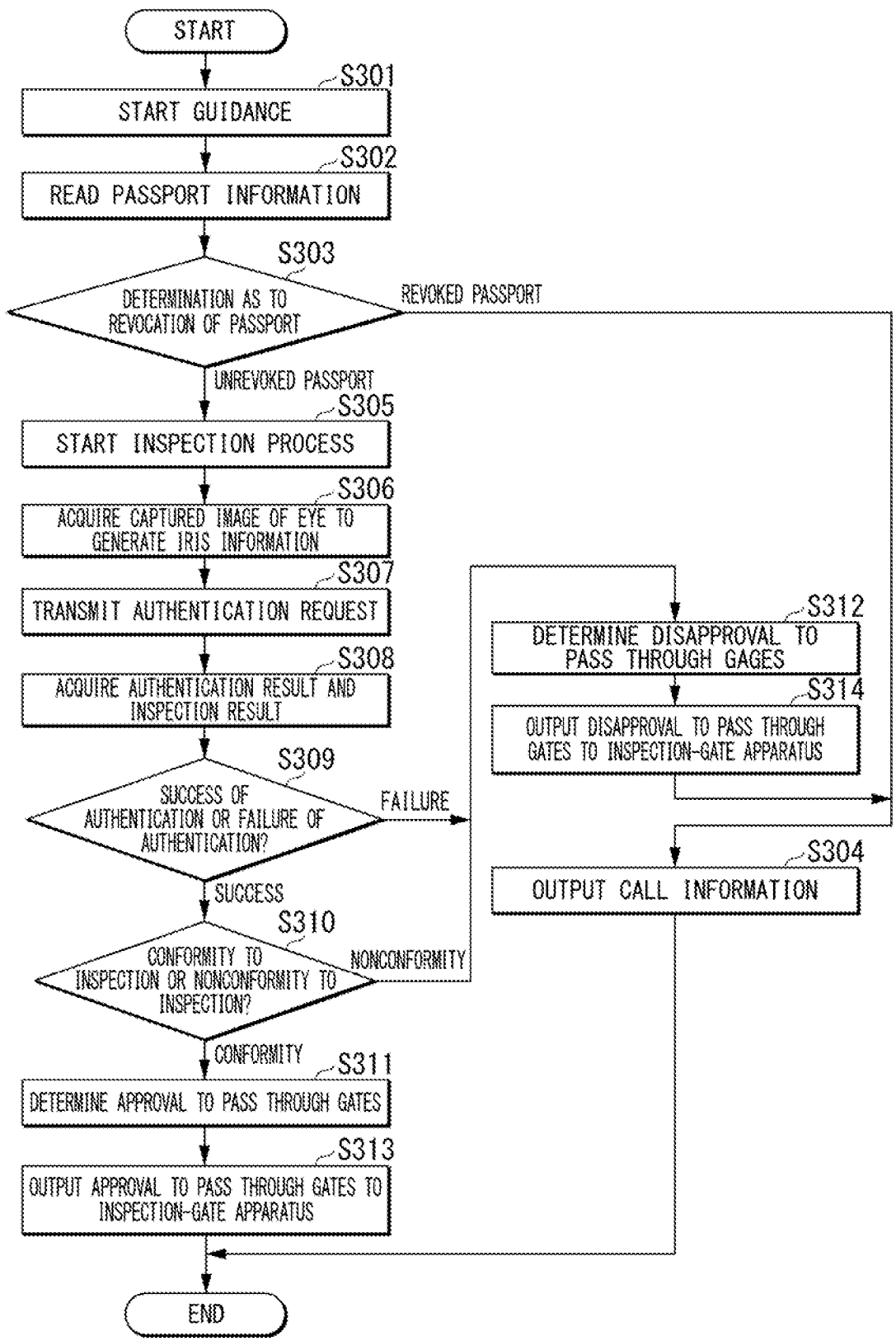
FIG. 6 is a flowchart showing a flow of processing of an inspection-gate apparatus according to the second exemplary embodiment of this disclosure.

FIG. 6 is a flowchart showing a flow of processing of an inspection-gate apparatus according to the second exemplary embodiment.

Figure 7:
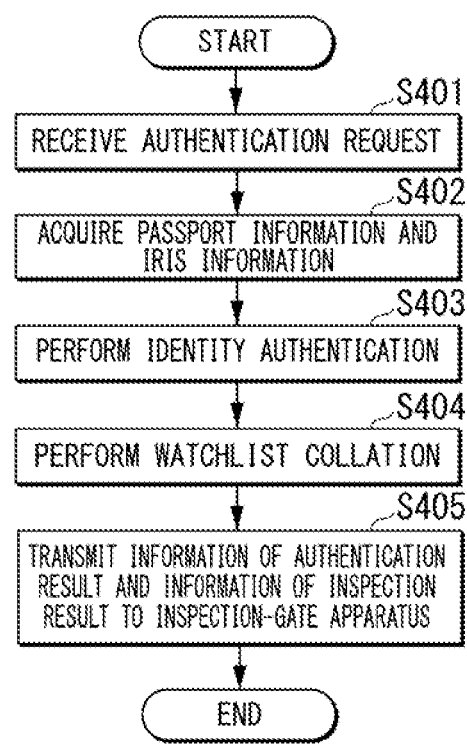
FIG. 7 is a flowchart showing a flow of processing of an authentication apparatus according to the second exemplary embodiment of this disclosure.

FIG. 7 is a flowchart showing a flow of processing of an authentication apparatus according to the second exemplary embodiment.

Next, the details of the processing of the information processing system according to the second exemplary embodiment will be described below.

For example, a user of the inspection-gate apparatus 1 in an attempt to enter into a certain country may approach the inspection-gate apparatus 1 installed in the neighborhood of immigration gates. The control unit 41 of the inspection-gate apparatus 1 repeatedly acquires images captured by the camera 12 so as to detect a user approaching the inspection-gate apparatus 1 based on the position and the size of a person's face, thus starting a guidance (step S301). The control unit 41 of the inspection-gate apparatus 1 may start a guidance upon detecting the user approaching the inspection-gate apparatus 1 according to the sensing information obtained from a human-detecting sensor such as an infrared sensor. The control unit 41 outputs to the display 14 the guidance information used for acquiring the passport information.

The guidance information displays instructions for a user to open a page of a passport indicating attribute information related to the user and to place the opened page of a passport at a predetermined position of the passport-information-reading device 13 or to hold the opened page of a passport over the predetermined position of the passport-information-reading device 13. The user watching the guidance information may open a predetermined page of a passport so as to place the passport at the predetermined position of the passport-information-reading device 13 such that the passport-information-reading device 13 can read the predetermined page of the passport.

The passport processing unit 42 outputs to the passport-information-reading device 13 an instruction to capture an image of a passport at a predetermined timing upon detecting an event in which the passport is placed at the predetermined position with a sensor or the like. Accordingly, the passport-information-reading device 13 can capture an image of a page containing the user's attribute information. As the attribute information, the page includes the information related to the user's passport (e.g., a passport type, an issuance country, a passport number, a surname, a name, a nationality, a birth date, a gender, an issuance date, and an expiration date of a validity term).

In addition, the passport processing unit 42 instructs the passport-information-reading device 13 to read the information (e.g., passport information) stored on a storage device embedded in a passport at the predetermined timing. The passport-information-reading device 13 reads the passport information from an IC chip embedded in a passport (step S302). Similarly, the passport information may include a passport type, an issuance country, a passport number, a surname, a name, a nationality, a birthdate, a gender, an issuance date, an expiration date of a validity term, and the like. The read passport information may include biological information such as the user's facial feature information.

The passport processing unit 42 temporarily stores the passport information and the captured image of a passport. The passport processing unit 42 determines whether the passport is a revoked passport using at least one of the passport information and the captured image of the passport (step S303). The passport processing unit 42 determines revocation of a passport using known techniques. The passport processing unit 42 outputs to the inspection management unit 44 the information as to whether or not the passport is determined as a revoked passport based on the passport information. Upon determining the passport as a revoked passport, the inspection management unit 44 may output call information to a terminal managed by an immigration inspector (step S304). In this connection, it is possible to make a decision as to revocation of a passport in such a manner that the inspection-gate apparatus 1 transmits the passport information and the captured image of the passport to the authentication apparatus 2 so as to make an inquiry with the authentication apparatus 2 while the authentication apparatus 2 carries out a similar process of an inspection-gate apparatus using the passport information and the captured image of the passport.

The inspection management unit 44 starts an inspection process when the passport is not determined as a revoked passport (step S305). The inspection management unit 44 instructs the first acquisition unit 43 to start its process. Subsequently, the first acquisition unit 43 instructs the camera 12 (or an iris reading device) to start its operation. In addition, the first acquisition unit 43 displays on the display 14 a guidance image for starting to read an iris. The guidance image displays various pieces of information for guiding the position of the camera 12 (or an iris reading device) and the stand position of a user for acquiring an image of an iris using the camera 12. The user watching the guidance information should stand at the predetermined position in front of the inspection-gate apparatus 1 so as to adjust the height of a face and the direction of eyes such that the camera (or an iris reading device) can capture an image of an iris.

The camera 12 (or an iris reading device) may capture an image of eyes at a predetermined timing upon detecting an event of locating a face and eyes at the predetermined position(s) with a sensor or the like. The camera 12 (or an iris reading device) generates iris information based on the captured image (step S306). The camera 12 generates and outputs the iris information to the first acquisition unit 43. The first acquisition unit 43 receives the iris information. The first acquisition unit 43 outputs the iris information to the inspection management unit 44. The inspection management unit 44 transmits to the authentication apparatus 2 an authentication request including the iris information and the passport information obtained by the passport processing unit 42 (step S307).

The authentication apparatus 2 receives the authentication request (step S401). The authentication apparatus 2 retrieves the passport information and the iris information included in the authentication request (step S402). The authentication apparatus 2 performs an identity authentication based on the passport information and the iris information (step S403). Specifically, the identity authentication unit 53 of the authentication apparatus 2 determines whether an association between the passport information and the iris information is recorded on the registrant table. Upon determining that the iris information and the passport information retrieved from the authentication request are registered on the registrant table in an associative manner, the identity authentication unit 53 determines a success of the identity authentication. Upon determining that the iris information and the passport information retrieved from the authentication request are not registered on the registrant table in an associative manner, the identity authentication unit 53 determines a failure of the identity authentication.

Upon determining a success of authentication via the identity authentication, the authentication apparatus 2 performs a watchlist collation (step S404). The watchlist collation is a process to determine whether the information of a user identified via the identity authentication is recorded on the watchlist table. Specifically, the second acquisition unit 52 of the authentication apparatus 2 acquires the fingerprint impression information which is associated with the iris information retrieved from the authentication request and registered on the registrant table. The second acquisition unit 52 outputs the fingerprint impression information to the inspection unit 54. The inspection unit 54 performs a collation of the fingerprint impression information and the finger print information registered on the watchlist table via a 1:n collation algorithm, thus determining whether the fingerprint information of a person indicated by the fingerprint impression information is included in the watchlist table. Upon determining that the fingerprint information of a person indicated by the fingerprint impression information is included in the watchlist table, the inspection unit 54 generates conformity information representing conformity to inspection requirements. Upon determining that the fingerprint information of a person indicated by the fingerprint impression information is not included in the watchlist table, the inspection unit 54 generates nonconformity information representing nonconformity to inspection requirements. The communication unit 54 of the authentication apparatus 2 transmits to the inspection-gate apparatus 1 the information representing a result of authentication via the identity authentication (e.g., a success of authentication or a failure of authentication) and the information representing a result of inspection via a watchlist collation (e.g., conformity information representing conformity to inspection requirements or nonconformity information representing nonconformity to inspection requirements) (step S405).

The inspection management unit 44 of the inspection-gate apparatus 1 acquires a result of authentication and a result of inspection (step S308). The inspection management unit 44 determines whether the result of authentication indicates a success of authentication or a failure of authentication (step S309). Upon determining a success of authentication, the inspection management unit 44 determines whether the result of inspection indicates conformity of inspection requirements or nonconformity of inspection requirements (step S310). Upon determining the conformity of inspection requirements, the inspection management unit 44 gives an approval to pass through gates (step S311). Upon determining that the result of authentication indicates a failure of authentication or upon determining that the result of inspection indicates nonconformity of inspection requirements, the inspection management unit 44 gives a disapproval to pass through gates (step S312). According to the approval to pass through gates, for example, the inspection management unit 44 outputs the approval to pass through gates to the gate equipment (step S313). Subsequently, the gate equipment opens gates and allows a user to pass through gates. According to the disapproval to pass through gates, the inspection management unit 44 outputs the disapproval to pass through gates to the gate equipment (step S314). Subsequently, the gate equipment closes gates to prevent a user from passing through gates. According to the disapproval to pass through gates, alternatively, the inspection management unit 44 may output call information to a terminal managed by an immigration inspector.

According to the aforementioned processes, the information processing system 100 is configured to identify the user's fingerprint impression information from the user's iris information and to perform a watchlist collation using the fingerprint impression information. Therefore, it is possible for the information processing system 100 to perform a watchlist collation without acquiring the fingerprint impression information from a user at the inspection-gate apparatus 1. Since the inspection-gate apparatus 1 does not need to directly acquire the fingerprint impression information from a user, it is possible to reduce a chance of multiple users repeatedly touching a certain portion of the same apparatus for the purpose of acquiring their fingerprint impression information. Thus, it is possible to reduce a degree of transmitting viruses from one person to another person. According to the aforementioned processes, users do not need to directly touch the inspection-gate apparatus 1 with hands, and therefore it is possible to reduce a degree of transmitting viruses via hands. According to the aforementioned processes, it is possible to reduce a degree of transmitting viruses and to perform a collation using a small amount of information such as noncontact information and a large amount of information such as fingerprint impression information.

Third Exemplary Embodiment

It is possible to modify the first exemplary embodiment and the second exemplary embodiment such that the inspection-gate apparatus 1 may acquire the captured image including a face of an authentication subject when acquiring noncontact information such as noncontact fingerprint information and iris information. Subsequently, the inspection-gate apparatus 1 may generate facial feature information of an authentication subject so as to store the facial feature information as the noncontact information in an authentication request to be transmitted to the authentication apparatus 2. In addition, it is possible to modify the first exemplary embodiment and the second exemplary embodiment such that the identity authentication unit 53 of the authentication apparatus 1 may determine whether the facial feature information included in the authentication request matches the facial feature information retrieved from the passport information, thus determining a success of the identity authentication upon matched. Similar to the first exemplary embodiment and the second exemplary embodiment, the present exemplary embodiment using noncontact information such as facial feature information derived from a facial image can be designed such that the authentication apparatus 2 may perform a collation of fingerprint impression information associated with noncontact information and registered on the registrant table while the inspection-gate apparatus 1 may control open/close operations of gates.

Fourth Exemplary Embodiment

Figure 8:
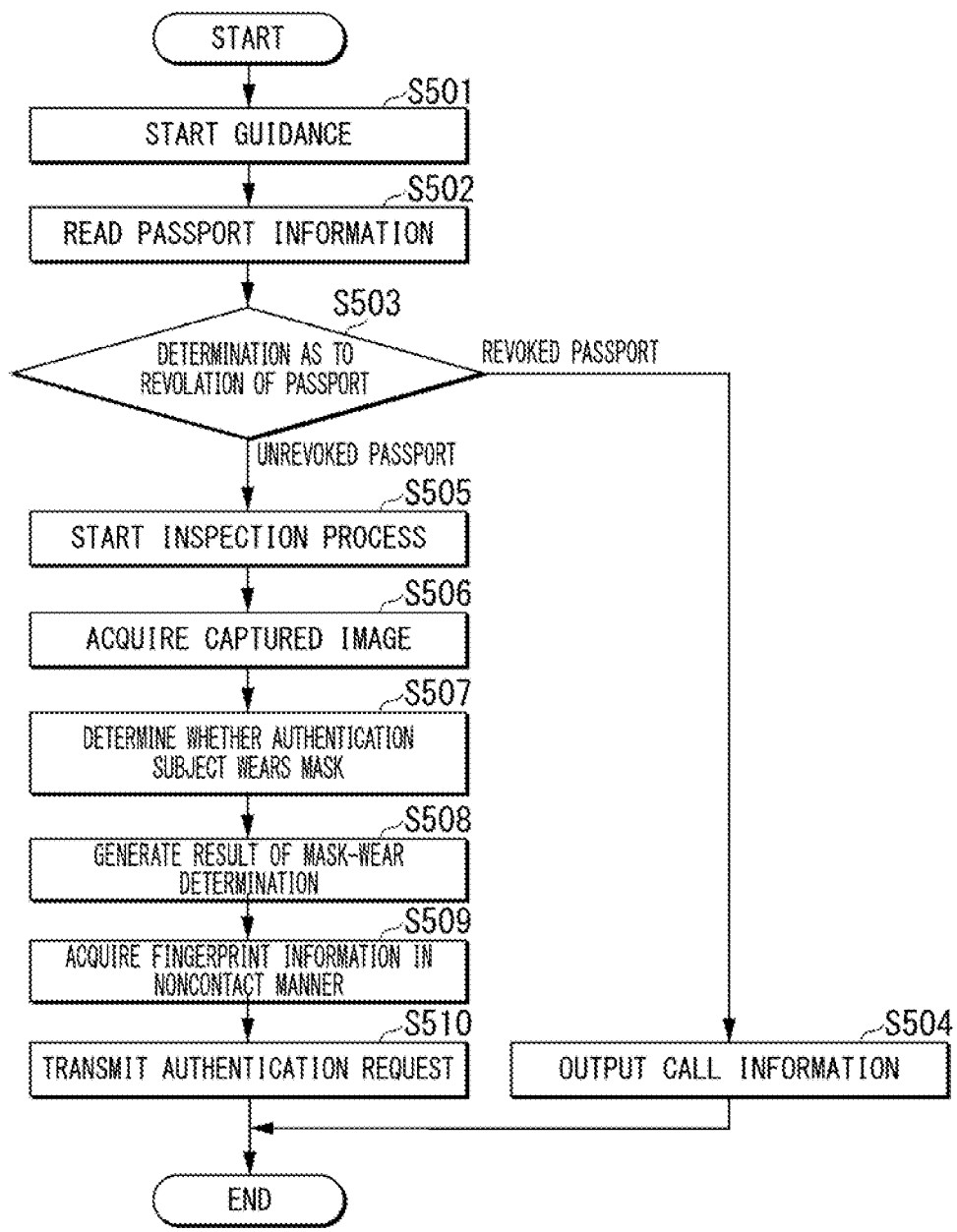
FIG. 8 is a first flowchart showing a flow of processing of an inspection-gate apparatus according to the fourth exemplary embodiment of this disclosure.

FIG. 8 is a first flowchart showing a flow of processing of an inspection-gate apparatus according to the fourth exemplary embodiment.

Figure 9:
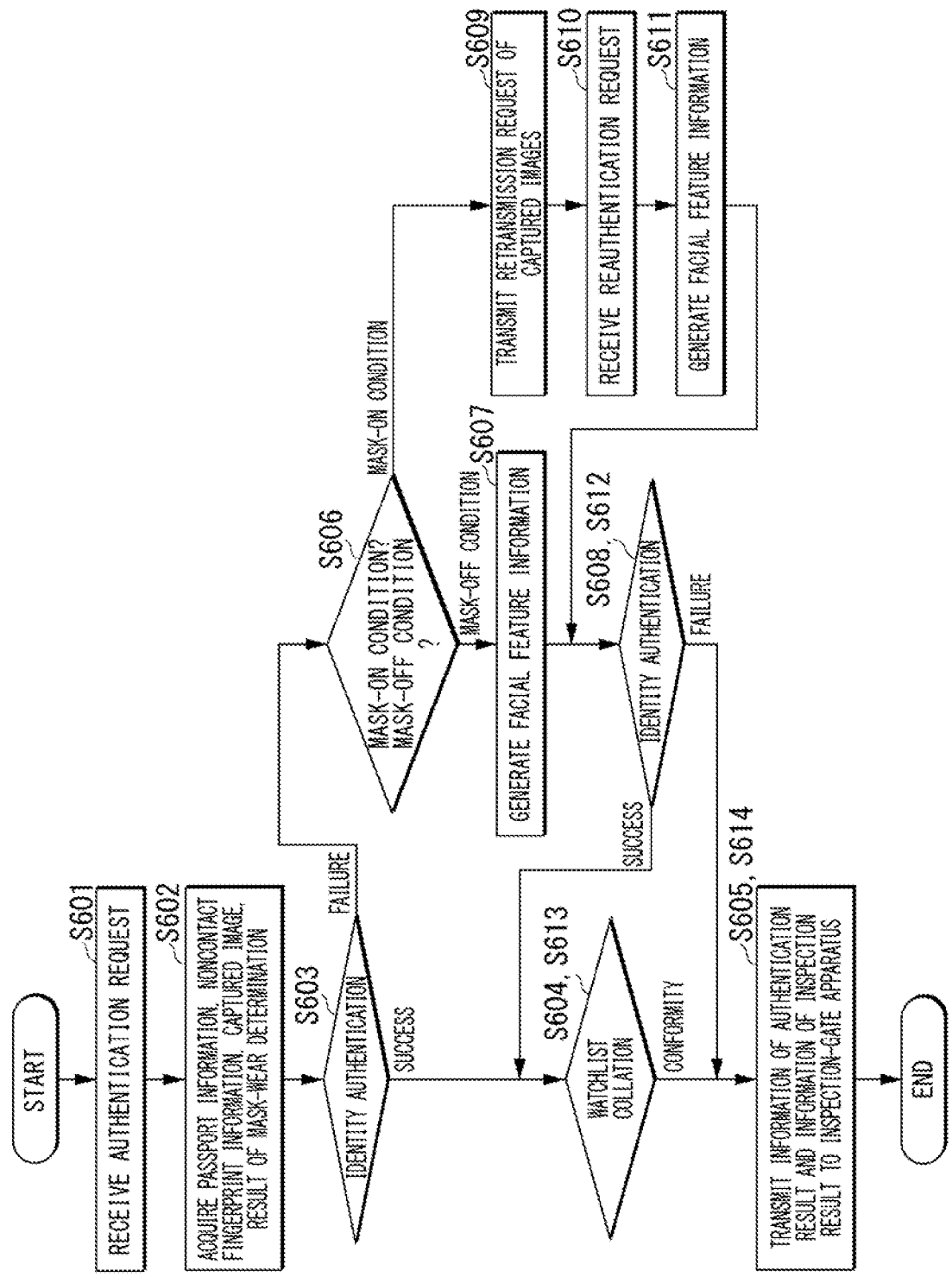
FIG. 9 is a flowchart showing a flow of processing of an authentication apparatus according to the fourth exemplary embodiment of this disclosure.

FIG. 9 is a flowchart showing a flow of processing of an authentication apparatus according to the fourth exemplary embodiment.

Figure 10:
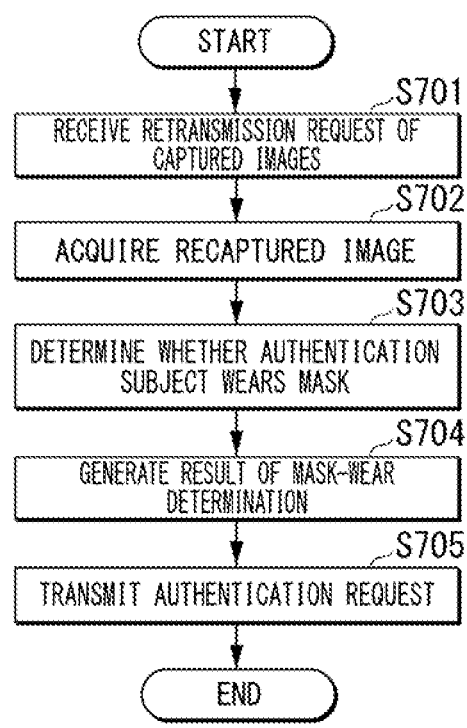
FIG. 10 is a second flowchart showing a flow of processing of an inspection-gate apparatus according to the fourth exemplary embodiment of this disclosure.

FIG. 10 is a second flowchart showing a flow of processing of an inspection-gate apparatus according to the fourth exemplary embodiment.

The fourth exemplary embodiment refers to an example in which an authentication subject may wear a facial outfitting such as a mask, glasses, and a hat on/above a face.

Next, details of the processing of an information processing system according to the fourth exemplary embodiment will be described below.

For example, a user in an attempt to enter into a certain country by using the inspection-gate apparatus 1 approaches the inspection-gate apparatus 1 set up in the neighborhood of immigration gates. The control unit 41 of the inspection-gate apparatus 1 repeatedly acquire images captured by the camera 12 so as to detect that the user approaches the inspection-gate apparatus 1 based on the position and the size of a person's face reflected in captured images, thus starting a guidance (step S501). The control unit 41 of the inspection-gate apparatus 1 may start a guidance upon detecting a user approaching the inspection-gate apparatus 1 according to sensing information obtained from a human-detecting sensor such as an infrared sensor. The control unit 41 outputs to the display 14 the guidance information used for acquiring passport information.

The guidance information displays instructions for a user to open a page of a passport indicating user's attribute information and to place the passport at a predetermined position of the passport-information-reading device 13 or to hold the passport over a predetermined position of the passport-information-reading device 13. The user watching the guidance information may open a predetermined page of a passport so as to place the passport at the predetermined position of the passport-information-reading device 13 such that the passport-information-reading device 13 can read the predetermined page of the passport.

Upon detecting that the passport is placed at the predetermined position with a sensor or the like, the passport processing unit 42 outputs to the passport-information-reading device 13 an instruction to capture an image of the passport at a predetermined timing. Subsequently, the passport-information-reading device 13 may image the page of the passport indicating the user's attribute information. As the attribute information, the page of the passport describes various pieces of information relating the user's passport (e.g., a passport type, an issuance country, a passport number, a surname, a name, a nationality, a birthdate, a gender, an issuance date, and an expiration date of a validity term).

In addition, the passport processing unit 42 instructs the passport-information-reading device 13 to read the information (e.g., passport information) of a storage device embedded in the passport at the predetermined timing. The passport-information-reading device 13 reads the passport information from an IC chip embedded in the passport (step S502). Similarly, the passport information may include various pieces of information such as a passport type, an issuance country, a passport number, a surname, a name, a nationality, a birthdate, a gender, an issuance date, and an expiration date of a validity term. The read passport information may further include biological information such as user's facial feature information.

The passport processing unit 42 temporarily stores the passport information and the captured image of a passport. The passport processing unit 42 determines revocation of the passport using at least one of the passport information and the captured image of the passport (step S503). The passport processing unit 42 determines whether the passport is a revoked passport using known techniques. The passport processing unit 42 outputs to the inspection management unit 44 the information as to whether or not the passport is determined as a revoked passport based on the passport information. Upon determining that the passport is a revoked passport, the inspection management unit 44 may output call information to a terminal managed by an immigration inspector (step S504). For the purpose of making a decision as to whether the passport is a revoked passport, the inspection-gate apparatus 1 may make an inquiry with the authentication apparatus 2 by transmitting the passport information and the captured image of the passport to the authentication apparatus 2 while the authentication apparatus 2 may carry out a similar process of the inspection-gate apparatus using the passport information and the captured image of the passport.

Upon determining that the passport is not a revoked passport, the inspection management unit 44 starts an inspection process (step S505). The inspection management unit 44 instructs the first acquisition unit 43 to start its process. Subsequently, the first acquisition unit 43 instructs the camera 12 to capture a facial image of an authentication subject. In addition, the first acquisition unit 43 displays on the display 14 a guidance image for starting to capture a facial image. The guidance information displays various pieces of information such as the position of the camera 12 and the stand position of a user when capturing a facial image with the camera 12. The user using the guidance information may stand at a predetermined position in front of the inspection-gate apparatus 1 so as to adjust the height and the directivity of a face such that the camera 12 can capture a facial image.

Upon detecting a user's face located at the predetermined position with a sensor or the like, the camera 12 capture a facial image at the predetermined timing (step S506). The camera 12 outputs the captured image to the first acquisition unit 43. The first acquisition unit 43 acquires the captured image. The first acquisition unit 43 outputs the captured image to the inspection management unit 44. The first acquisition unit 43 determines whether an authentication subject wears a facial outfitting (e.g., a mask, glasses, a hat) on a face of an authentication subject reflected in the captured image representing the face of the authentication subject (step S507). For example, the inspection management unit 44 determines whether an authentication subject wears a mask on a face in the captured image representing the face of the authentication subject. According to a result of determination, the inspection management unit 44 produces a result of determining a countenance as to whether to wear a mask indicating either a mask-on condition or a mask-off condition (step S508). In this connection, the inspection-gate apparatus 1 is one aspect of a mask-wear-determining means for determining whether a face indicated by a facial image is wearing a mask.

The inspection-gate apparatus 1 may determine whether an authentication subject wears a mask on a face reflected in a facial image via pattern matching based on the pre-stored information representing the shape and/or the color of a mask. The inspection management unit 44 may learn an association between an input of a facial image wearing a mask in the past and an output of the information indicating a mask-on condition via machine learning to produce a mask-wear-determining model, thus determining whether an authentication subject is wearing a mask on his/her face reflected in the captured image. In the aforementioned process, the inspection management unit 44 may serve as a position to locate a mask-wear-determining means, which is configured to determine whether a face indicated by a facial image is worn by a mask, in the information processing system 100. The mask-wear-determining means may be installed in the authentication apparatus 2.

Upon producing a mask-wear determination result, the inspection management unit 44 instructs the first acquisition unit 43 to start an acquisition process to of noncontact information. The inspection management unit 44 outputs the captured image and the result of mask-wear determination to the first acquisition unit 43. The first acquisition unit 43 instructs the fingerprint reading device 11 to start its operation. In addition, the first acquisition unit 43 displays a guidance image for starting fingerprint acquisition on the display 14. The guidance image displays various pieces of information such as the position of the fingerprint reading device 11 and the position of a finger when acquiring its fingerprint with the fingerprint reading device 11. A user watching the guidance information may move his/her finger to a predetermined position.

Upon detecting that a user's finger is disposed at the predetermined position with a sensor or the like, the fingerprint reading device 11 acquires fingerprint information in a noncontact manner at a predetermined timing (step S509). The fingerprint reading device 11 generates noncontact fingerprint information. The fingerprint reading device 11 generates and outputs the noncontact fingerprint information to the first acquisition unit 43. The first acquisition unit 43 acquires the noncontact fingerprint information. The first acquisition unit 43 outputs the noncontact fingerprint information to the inspection management unit 44. The inspection management unit 44 transmits to the authentication apparatus 2 an authentication request including the result of mask-wear determination, the captured image, the noncontact fingerprint information, and the passport information acquired by the passport processing unit 42 (step S510).

The authentication apparatus 2 receives the authentication request (step S601). The authentication apparatus 2 retrieves the passport information, the noncontact fingerprint information, the captured image, and the result of mask-wear determination included in the authentication request (step S602). The authentication apparatus 2 performs an identity authentication based on the passport information and the noncontact fingerprint information (step S603). Specifically, the identity authentication unit 53 of the authentication apparatus 2 determines whether an association between the passport information and the noncontact fingerprint information is recorded on the registrant table. Upon determining that the noncontact fingerprint information and the passport information retrieved from the authentication request are registered on the registrant table in an associative manner, the identity authentication unit 53 determines a success of the identity authentication. Upon determining that the noncontact fingerprint information and the passport information retrieved from the authentication request are not registered on the registrant table in an associative manner, the identity authentication unit 53 determines a failure of the identity authentication.

When the identity authentication unit 53 of the authentication apparatus 2 determines a success of authentication via the identity authentication, the inspection unit 54 performs a watchlist collation (step S604). The watchlist collation is a process to determine whether the information of a user identified by the identity authentication is recorded on the watchlist table. Specifically, the second acquisition unit 52 of the authentication apparatus 2 acquires the facial feature information which is associated with the noncontact fingerprint information retrieved from the authentication request and registered on the registrant table. The second acquisition unit 52 outputs the facial feature information to the inspection unit 54. The inspection unit 54 performs a collation of the facial feature information with the facial feature information registered on the watchlist table via a 1:n collation algorithm, thus determining whether the facial feature information representing facial features of a person as an authentication subject identified from the registrant table is included in the watchlist table. Upon determining that the facial feature information representing facial features of a person as an authentication subject identified from the registrant table is included in the watchlist table, the inspection unit 54 generates conformity information representing conformity to inspection requirements. Upon determining that the facial feature information representing facial features of a person as an authentication subject identified from the registrant table is not included in the watchlist table, the inspection unit 54 generates nonconformity information representing nonconformity to inspection requirements. The communication unit 55 of the authentication apparatus 2 transmits to the inspection-gate apparatus 1 the information representing a result of authentication via an identity authentication (e.g., a success of authentication or a failure of authentication) and the information representing a result of inspection via a watchlist collation (e.g., conformity information representing conformity to inspection requirements or nonconformity information representing nonconformity to inspection requirements) (step S605).

According to the aforementioned processes, the information processing system 100 is configured to perform an identity authentication by comparing facial feature information of an authentication subject with the facial feature information included in the passport information when the facial feature information of an authentication subject associated with the noncontact fingerprint information is recorded on the registrant table irrespective a decision as to whether or not the authentication subject wears an outfitting such as a mask. In addition, it is possible to perform an inspection process via a watchlist collation using the facial feature information. Accordingly, it is possible to perform an authentication and an inspection process even when a user wears an outfitting such as mask without taking of the outfitting from his/her face.

In other exemplary embodiments, the identity authentication unit 53 determines a failure of an identity authentication when the noncontact fingerprint information and the passport information retrieved from the authentication request are not registered on the registrant table in an associative manner. In the present exemplary embodiment, the identity authentication unit 53 is configured to perform an identity authentication and a watchlist collation based on the feature information of a face reflected in the captured image of an authentication subject. Specifically, the identity authentication unit 53 acquires a result of mask-wear determination included in the authentication request when the noncontact fingerprint information and the passport information retrieved from the authentication request are not registered on the registrant table in an associative manner. The identity authentication unit 53 determines whether the result of mask-wear determination indicates a "mask-on condition" or a "mask-off condition" (step S606).

When the result of mask-wear determination indicates a "mask-off condition", the identity authentication unit 53 generates the facial feature information based on the captured image included in the authentication request (step S607). The identity authentication unit 53 acquires the facial feature information from the passport information. Subsequently, the identity authentication unit 53 performs an identity authentication by comparing the facial feature information derived from the captured image of the authentication request with the facial feature information from the passport information (step S608). Upon comparing the facial feature information derived from the captured image included in the authentication request with the facial feature information from the passport information, the identity authentication unit 53 determines a success of the identity authentication when a degree of matching is equal to or above a predetermined threshold value. Upon comparing the facial feature information derived from the captured image included in the authentication request with the facial feature information from the passport information, the identity authentication unit 53 determines a failure of the identity authentication when a degree of matching is less than the predetermined threshold value.

When the mask-wear determination result indicates a "mask-on condition", the identity authentication unit 53 transmits a retransmission request of captured images to the inspection-gate apparatus 1 (step S609). The inspection-gate apparatus 1 receives the retransmission request of captured images (step S701). The inspection management unit 44 receives the retransmission request of captured images. Subsequently, the inspection management unit 44 instructs the first acquisition unit 43 to start its process. The first acquisition unit 43 instructs the camera 12 to recapture a facial image of an authentication subject. In addition, the first acquisition unit 43 displays on the display 14 a guidance image for starting recapturing a facial image and for requesting a user to take off a mask. The guidance image displays various pieces of information such as the position of the camera 12 and the stand position of a user when recapturing a facial image with the camera 12. In addition, the guidance image displays a message requesting the user to take off a mask. The user watching the guidance image may stand at a predetermined position in front of the inspection-gate apparatus 1 while adjusting the height and the directivity of his/her face to be captured by the camera 12. In addition, the user should take off the mask from his/her face.

Upon detecting that a user's face is disposed at a predetermined position with a sensor or the like, the camera 12 recaptures a facial image at a predetermined timing (step S702). The camera 12 outputs the recaptured image to the first acquisition unit 43. The first acquisition unit 43 acquires the recaptured image. The first acquisition unit 43 outputs the recaptured image to the inspection management unit 44. The inspection management unit 44 determines an authentication subject wears a mask on his/her face reflected in the recaptured facial image thereof (step S703). According to the determination result, the inspection management unit 44 produces a mask-wear determination result indicating either a mask-on condition or a mask-off condition (step S704). Upon producing the result of mask-wear determination, the inspection management unit 44 transmits to the authentication apparatus 2 a reauthentication request including the recaptured image and the result of mask-wear determination (step S705). Although the camera 12 captures an image at a predetermined timing in step S702, the camera 12 may repeatedly capture images so as to output the captured images to the first acquisition unit 43. The inspection management unit 44 may sequentially acquire the captured images of the camera 12 from the first acquisition unit 43 so as to detect a mask-off event upon comparing a plurality of captured images, and then the inspection management unit 44 may automatically acquire a recaptured image as a captured image including a facial image acquired after detecting the mask-off event.

The authentication apparatus 2 receives the reauthentication request (step S610). The authentication apparatus 2 retrieves the recaptured image and the result of mask-wear determination included in the reauthentication request. The authentication apparatus 2 generates facial feature information of an authentication subject based on the recaptured image (step S611). The identity authentication unit 53 retrieves the facial feature information from the passport information which was already retrieved from the authentication request. Subsequently, the identity authentication unit 53 performs an identity authentication by comparing the facial feature information derived from the captured image included in the authentication request with the facial feature information derived from the reauthentication request (step S612).

The identity authentication unit 53 determines a success of an identity authentication when a degree of matching is equal to or above a predetermined threshold value upon comparing the facial feature information derived from the captured image included in the authentication request with the facial feature information derived from the reauthentication request. The identity authentication unit 53 determines a failure of the identity authentication when a degree of matching is less than the predetermined threshold value upon comparing the facial feature information derived from the captured image included in the authentication request with the facial feature information derived from the reauthentication request.

Upon determining a success of authentication via an identity authentication performed according to the reauthentication request, the inspection unit 54 of the authentication apparatus 2 performs a watchlist collation (step S613). The watchlist collation is a process for determining whether the information of a user identified by an identity authentication is recorded on the watchlist table. Specifically, the second acquisition unit 52 of the authentication apparatus 2 outputs to the inspection unit 54 the facial feature information produced according to the reauthentication request. The inspection unit 54 perform a collation of the facial feature information with the facial feature information registered on the watchlist table via a 1:n collation algorithm, thus determining whether the facial feature information of a person representing facial features of an authentication subject identified form the registrant table is included in the watchlist table. Upon determining that the facial feature information of a person representing facial features of an authentication subject identified from the registrant table is included in the watchlist table, the inspection unit 54 generates conformity information representing conformity to inspection requirements. Upon determining that the facial feature information of a person representing facial features of an authentication subject identified from the registrant table is not included in the watchlist table, the inspection unit 54 generates nonconformity information representing nonconformity to inspection requirements. The communication unit 54 of the authentication apparatus 2 transmits to the inspection-gate apparatus 1 the information representing a result of authentication via an identity authentication (e.g., a success of authentication or a failure of authentication) and the information representing a result of inspection via a watchlist collation (e.g., conformity information representing conformity to inspection requirements or nonconformity information representing nonconformity to inspection requirements) (step S614).

According to the aforementioned processes, when an identification authentication cannot be performed responsive to a first authentication request and when an authentication subject does not wear an outfitting such as a mask on his/her face, the information processing system 100 performs an identity authentication using the facial feature information derived from the captured facial image of the authentication subject. When an authentication subject wears an outfitting such as a mask on his/her face, the information processing system 100 may recapture a facial image of the authentication subject taking off its outfitting such as a mask according to a retransmission request of captured images, thus performing an identity authentication using the facial feature information derived from the recaptured facial image. That is, the present exemplary embodiment can provide a system for requesting an authentication subject to take off its outfitting such as a mask only when it is required to take off an outfitting such as a mask. According to the aforementioned processes, it is possible to reduce a degree of transmitting viruses via hands since users do not need to directly touch the inspection-gate apparatus 1 with their hands.

Fifth Exemplary Embodiment

Figure 11:
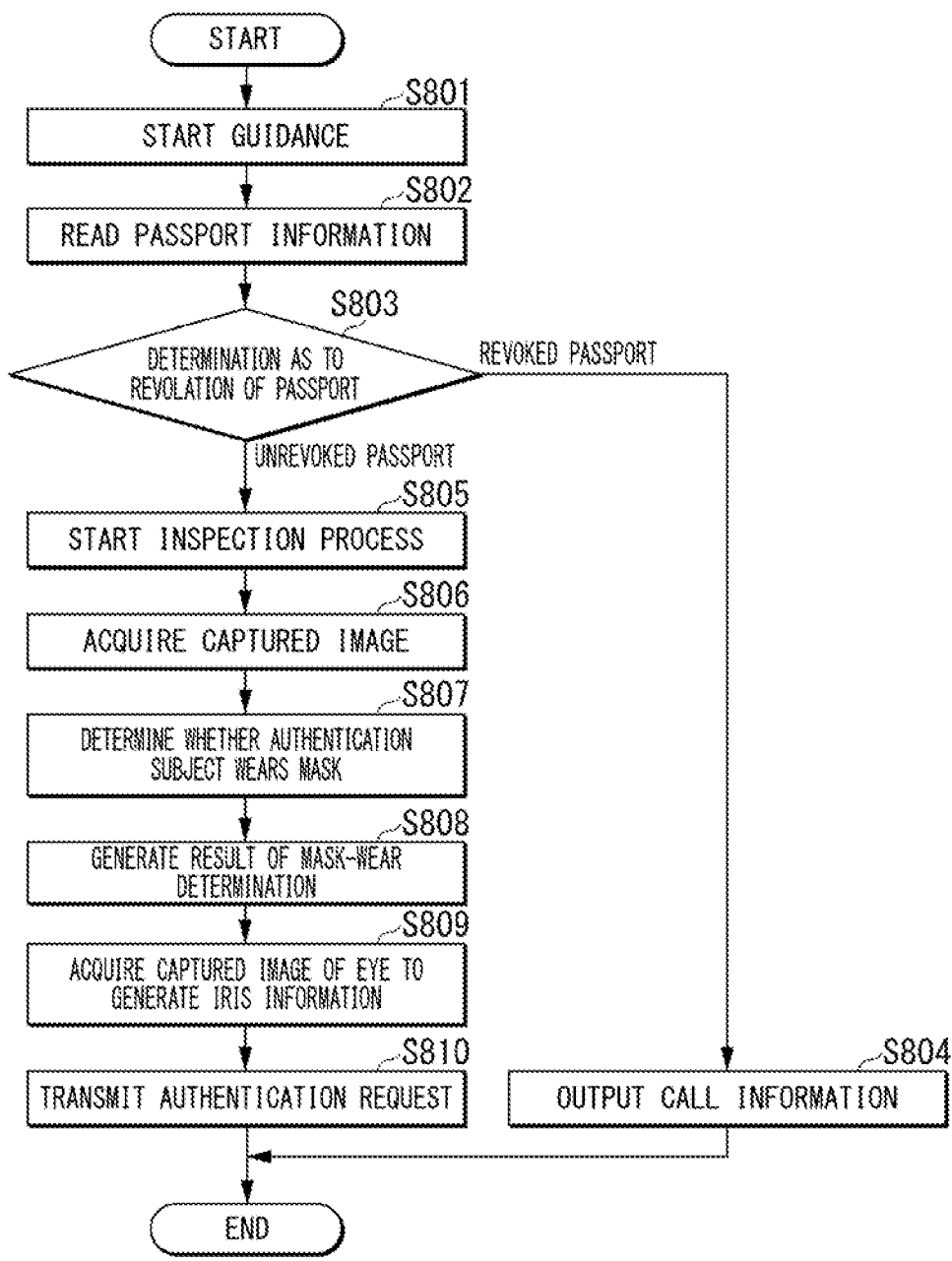
FIG. 11 is a first flowchart showing a flow of processing of an inspection-gate apparatus according to the fifth exemplary embodiment of this disclosure.

FIG. 11 is a first flowchart showing a flow of processing of an inspection-gate apparatus according to the fifth exemplary embodiment.

Figure 12:
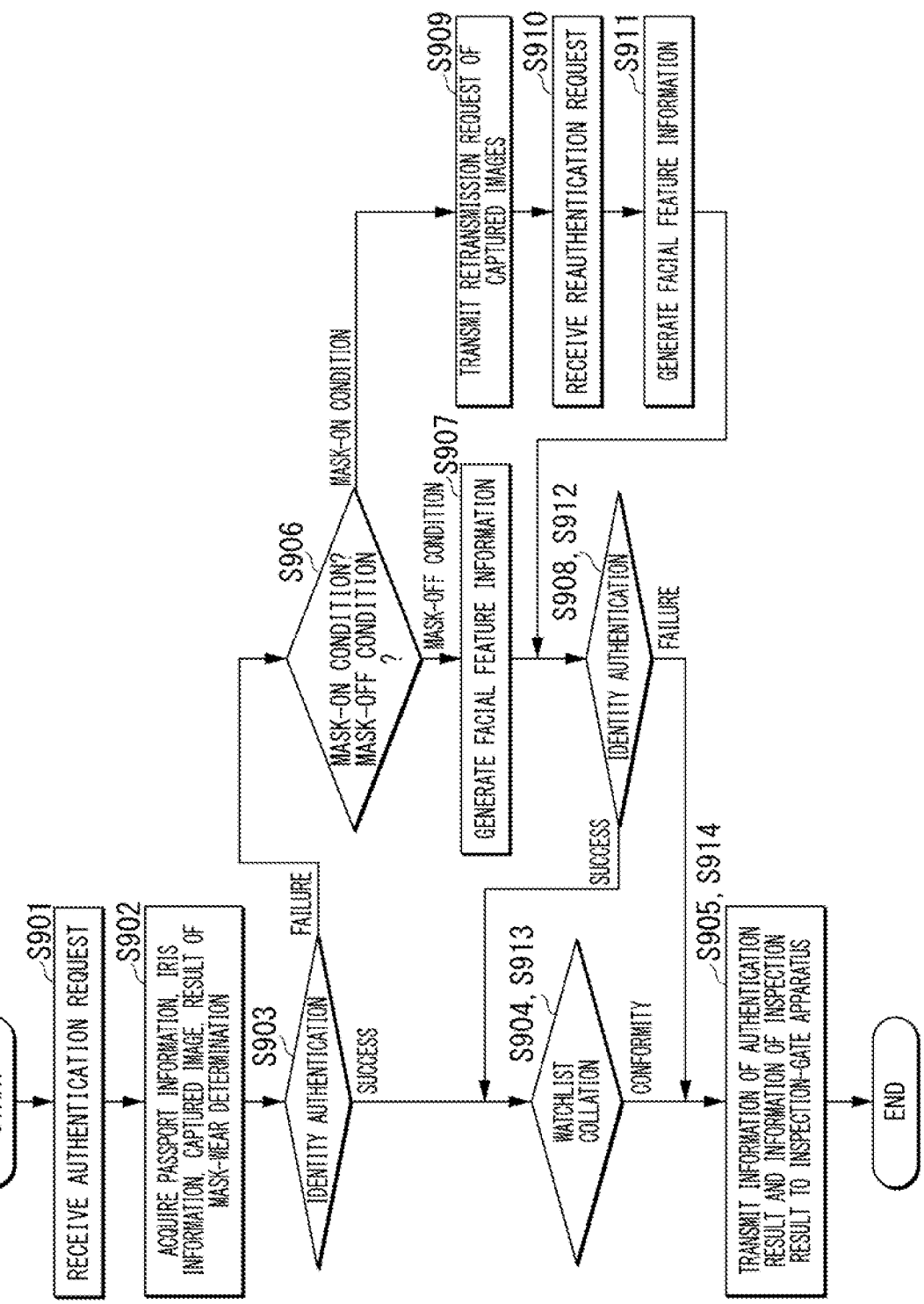
FIG. 12 is a flowchart showing a flow of processing of an authentication apparatus according to the fifth exemplary embodiment of this disclosure.

FIG. 12 is a flowchart showing a flow of processing of an authentication apparatus according to the fifth exemplary embodiment.

Figure 13:
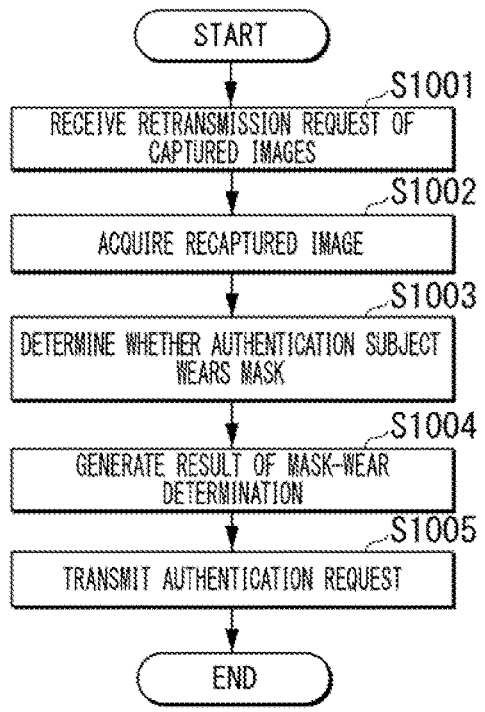
FIG. 13 is a second flowchart showing a flow of processing of an inspection-gate apparatus according to the fifth exemplary embodiment of this disclosure.

FIG. 13 is a second flowchart showing a flow of processing of an inspection-gate apparatus according to the fifth exemplary embodiment.

For example, a user in an attempt to enter into a certain country via the inspection-gate apparatus 1 may approach the inspection-gate apparatus set up in the neighborhood of immigration gates. The control unit 41 of the inspection-gate apparatus 1 repeatedly acquires images captured by the camera 12 so as to detect that a user approaches the inspection-gate apparatus 1 based on the position and the size of a face of a person reflected in the captured image(s), thus starting a guidance (step S801). The control unit 41 of the inspection-gate apparatus 1 may start a guidance upon detecting that a user approaches the inspection-gate apparatus 1 according to the sensing information obtained from a human-detecting sensor such as an infrared sensor. The control unit 41 outputs to the display 14 the guidance information for acquiring the passport information.

The guidance information includes instructions for the user to open the page of a passport containing the user's attribute information and to place the passport at a predetermined position of the passport-information-reading device 13 or to hold the passport over the predetermined position of the passport-information-reading device 13. The user watching the guidance information may open a predetermined page of a passport so as to place the passport at the predetermined position of the passport-information-reading device 13 such that the passport-information-reading device 13 can read the predetermined page of the passport.

Upon detecting that the passport is placed at the predetermined position with a sensor or the like, the passport processing unit 42 outputs to the passport-information-reading device 13 an instruction to capture an image of the passport at the predetermined timing. Subsequently, the passport-information-reading device 13 may capture an image of a certain page of a passport containing the user's attribute information. As the attribute information, the page includes the information relating to the user's passport (e.g., a passport type, a passport number, a surname, a name, a nationality, a birthdate, a gender, an issuance date, and an expiration date of a validity term).

In addition, the passport processing unit 42 instructs the passport-information-reading device 13 to retrieve the information (e.g., passport information) of a storage device embedded in the passport at the predetermined timing. The passport-information-reading device 13 reads the passport information from an IC chip embedded in the passport (step S802). Similarly, the passport information may include various pieces of information such as a passport type, an issuance country, a passport number, a surname, a name, a nationality, a gender, an issuance date, and an expiration date of a validity term. In addition, the read passport information includes biological information such as the user's facial feature information.

The passport processing unit 42 temporarily stores the passport information and the captured image of a passport. The passport processing unit 42 determines whether the passport is a revoked passport using at least one of the passport information and the captured image of the passport (step S803). The passport processing unit 42 determines revocation of a passport using known techniques. The passport processing unit 42 outputs to the inspection management unit 44 the information as to whether or not the passport is determined as a revoked passport based on the passport information. When the passport is determined as a revoked passport, the passport management unit 44 may output call information to a terminal managed by an immigration inspector (step S804). For the purpose of determining revocation of a passport, the inspection-gate apparatus 1 may send an inquiry to the authentication apparatus 2 by transmitting the passport information and the captured image of the passport while the authentication apparatus 2 may perform a similar process of an inspection-gate apparatus using the passport information and the captured image of the passport.

The inspection management unit 44 starts to perform an inspection process when the passport is not determined as a revoked passport (step S805). The inspection management unit 44 instructs the first acquisition unit 43 to start its process. Subsequently, the first acquisition unit 43 instructs the camera 12 to capture an image of a face of an authentication subject. In addition, the first acquisition unit 43 displays on the display 14 a guidance image for starting an operation to capture a facial image. The guidance image displays the position of the camera 12 and the information for guiding the stand position of a user when capturing a facial image. The user watching the guidance image may stand at the predetermined position in front of the inspection-gate apparatus 1 so as to adjust the height and the directivity of a user's face such that the camera 12 can capture a facial image.

The camera 12 captures a facial image at a predetermined timing upon detecting that a face is disposed at a predetermined position with a sensor or the like (step S806). The camera 12 outputs the captured image to the first acquisition unit 43. The first acquisition unit 43 acquires the captured image. The first acquisition unit 43 outputs the captured image to the inspection management unit 44. The inspection management unit 44 determines whether an authentication subject wears an outfitting (e.g., a mask, glasses, a hat) on his/her face reflected in the captured image showing the face of the authentication subject (step S807). For example, the inspection management unit 44 determines whether an authentication subject wears a mask on his/her face reflected in the captured image showing the face of the authentication subject. According to a result of determination, the inspection management unit 44 generates a result of mask-wear determination indicating either a mask-on condition or a mask-off condition (step S808).

The inspection management unit 44 may determine whether an authentication subject wears a mask on his/her face reflected in the captured image showing the face of the authentication subject via pattern matching based on the pre-stored information representing the shape or the color of a mask. The inspection management unit 44 may learn an association between an input of a facial image wearing a mask in the past and an output of the information indicating a mask-on condition, via machine learning to produce a mask-wear determination model, thus determining whether an authentication subject wears a mask on his/her face reflected in the captured image according to the mask-wear determination model. In the aforementioned process, the inspection management unit 44 may serve as a position to locate a mask-wear-determining means, which is configured to determine whether a face indicated by a facial image is worn by a mask, in the information processing system 100. The mask-wear-determining means may be installed in the authentication apparatus 2.

Upon producing a result of mask-wear determination, the inspection management unit 44 instructs the first acquisition unit 43 to start its acquisition process of noncontact information. The inspection management unit 44 outputs to the first acquisition unit 43 the captured image and the result of mask-wear determination. The first acquisition unit 43 instructs the camera 12 to start its operation. In addition, the first acquisition unit 43 displays on the display 14 a guidance image for starting acquiring an iris image. The guidance image displays various pieces of information representing the position of the camera 12 and the stand position of a user for acquiring an iris image with the camera 12 (or an iris reading device). The user watching the guidance image may stand at the predetermined position in front of the inspection-gate apparatus 1 so as to adjust the height of a face and the direction of eyes such that the camera 12 can capture an iris image.

The camera 12 captures an image of an eye at a predetermined timing upon detecting that the user's face and eyes are located at predetermined positions with a sensor or the like. The camera 12 (or an iris reading device) generates iris information based on the captured image thereof (step S809). The camera (or an iris reading device) generates and outputs the iris information to the first acquisition unit 43. The first acquisition unit 43 receives the iris information. The first acquisition unit 43 outputs the iris information to the inspection management unit 44. The inspection management unit 44 transmits to the authentication apparatus 2 an authentication request including the iris information, the captured image, the result of mask-wear determination, and the passport information acquired by the passport processing unit 42 (step S810).

The authentication apparatus 2 receives the authentication request (step S901). The authentication apparatus 2 retrieves the passport information, the iris information, the captured image, and the result of mask-wear determination included in the authentication request (step S902). The authentication apparatus 2 performs an identity authentication based on the passport information and the iris information (step S903). Specifically, the identity authentication unit 53 of the authentication apparatus 2 determines whether an association between the passport information and the iris information is recorded on the registrant table. The identity authentication unit 53 determines a success of the identity authentication when the passport information and the iris information retrieved from the authentication request are registered on the registrant table in an associative manner. The identity authentication unit 53 determines a failure of the identity authentication when the passport information and the iris information retrieved from the authentication request are not registered on the registrant table in an associative manner.

Upon determining a success of authentication via the identity authentication, the authentication apparatus 2 performs a watchlist collation (step S904). The watchlist collation is a process to determine whether the user's information identified by the identity authentication is recorded on the watchlist table. Specifically, the second acquisition unit 52 of the authentication apparatus 2 acquires the facial feature information which is associated with the iris information retrieved from the authentication request and registered on the registrant table. The second acquisition unit 52 outputs the facial feature information to the inspection unit 54. The inspection unit 54 performs a collation of the facial feature information with the facial feature information registered on the watchlist table via a 1:n collation algorithm, thus determining whether the facial feature information of a person representing facial features of an authentication subject identified from the registrant table is included in the watchlist table. Upon determining that the facial feature information of a person representing facial features of an authentication subject identified from the registrant table is included in the watchlist table, the inspection unit 54 generates conformity information representing conformity to inspection requirements. Upon determining that the facial feature information of a person representing facial features of an authentication subject identified from the registrant table is not included in the watchlist table, the inspection unit 54 generates nonconformity information representing nonconformity to inspection requirements. The communication unit 55 of the authentication apparatus 2 transmits to the inspection-gate apparatus 1 the information representing a result of authentication via an identity authentication (e.g., a success of authentication or a failure of authentication) and the information representing a result of inspection via a watchlist collation (e.g., conformity information representing conformity to inspection requirements or nonconformity information representing nonconformity to inspection requirements) (step S905).

According to the aforementioned process, the information processing system 100 is configured to perform an identity authentication by comparing the facial feature information with the facial feature information included in the passport information when the facial feature information of an authentication subject is associated with the iris information and registered on the registrant table irrespective of a decision as to whether or not the authentication subject wears an outfitting such as a mask. In addition, it is possible to perform an inspection process via a watchlist collation using the facial information. That is, it is possible to perform an authentication and an inspection process for a user wearing an outfitting such as a mask on his/her face without taking off the outfitting such as a mask.

In other exemplary embodiments, the identity authentication unit 53 determines a failure of an identity authentication when the iris information and the passport information retrieved from an authentication request are not registered on the registrant table in an associative manner. In the present exemplary embodiment, the identity authentication unit 53 performs an identity authentication and a watchlist collation based on the facial feature information representing facial features of an authentication subject reflected in the captured image. Specifically, when the iris information and the passport information retrieved from an authentication request are not registered on the registrant table in an associative manner, the identity authentication unit 53 determines a result of mask-wear determination either a "mask-on condition" or a "mask-off condition" (step S906).

When the result of mask-wear determination indicates a "mask-off condition", the identity authentication unit 53 generates the facial feature information based on the captured image included in an authentication request (step S907). The identity authentication unit 53 retrieves the facial feature information from the passport information. Subsequently, the identity authentication unit 53 performs an identity authentication by comparing the facial feature information derived from the captured image included in the authentication request with the facial feature information from the passport information (step S908). Upon comparing the facial feature information derived from the captured image included in the authentication request with the facial feature information from the passport information, the identity authentication unit 53 determines a success of the identity authentication when a matching degree is equal to or above a predetermined threshold value. Upon comparing the facial feature information derived from the captured image included in the authentication request with the facial feature information from the passport information, the identity authentication unit 53 determines a failure of the identity authentication when a matching degree is less than the predetermined threshold value.

When the result of mask-wear determination indicates a "mask-on condition", the identity authentication unit 53 transmits a retransmission request of captured images to the inspection-gate apparatus 1 (step S909). The inspection-gate apparatus 1 receives the retransmission request of captured images (step S1001). The inspection management unit 44 receives the retransmission request of captured images. Subsequently, the inspection management unit 44 instructs the first acquisition unit 43 to start its process. The first acquisition unit 43 instructs the camera 12 to recapture a facial image of an authentication subject. In addition, the first acquisition unit 43 displays on the display 14 a guidance image for starting recapture of a facial image while requesting a user to take off a mask. The guidance image displays various pieces of information for guiding the position of the camera 12 and the stand position of a user when capturing a facial image with the camera 12. In addition, the guidance image displays a message requesting a user to take off a mask. The user watching the guidance image may stand at the predetermined position in front of the inspection-gate apparatus 1 so as to adjust the height and the directivity of his/her face such that the camera 12 can capture a facial image. In addition, the user needs to take off a mask.

The camera 12 captures a facial image as a recaptured image at a predetermined timing upon detecting that a face is disposed at a predetermined position with a sensor or the like (step S102). The camera 12 outputs the recaptured image to the first acquisition unit 43. The first acquisition unit 43 acquires the recaptured image. The first acquisition unit 43 outputs the recaptured image to the inspection management unit 44. The inspection management unit 44 determines whether an authentication subject wears a mask on his/her face reflected in the recaptured image showing a facial image of the authentication subject (step S1003). According to the result of determination, the inspection management unit 44 produces a result of mask-wear determination indicating either a mask-on condition or a mask-off condition. Upon producing the result of mask-wear determination, the inspection management unit 44 transmits to the authentication apparatus 2 a reauthentication request including the recaptured image and the result of mask-wear determination (step S1004). Although the step S1002 indicates the camera 12 to capture an image at a predetermined timing, it is possible for the camera 12 to repeatedly capture and output images to the first acquisition unit 43. The inspection management unit 44 sequentially acquire captured images output from the camera 12 via the first acquisition unit 43 so as to detect a mask-off event by comparing multiple captured images, thus automatically acquiring a recaptured image representing a facial image captured after the mask-off event.

The authentication apparatus 2 receives the reauthentication request (step S910). The authentication apparatus 2 retrieves the recaptured image and the result of mask-wear determination included in the reauthentication request. When the result of mask-wear determination included in the reauthentication request indicates a mask-on condition again, the authentication apparatus 2 may stop its process to transmit to the inspection-gate apparatus 1 the information representing a failure of authentication because the identity authentication results in a failure. When the result of mask-wear determination indicates a "mask-off condition", the authentication apparatus 2 generates the facial feature information of an authentication subject based on the recaptured image (step S911). The identity authentication unit 53 acquires the facial feature information from the passport information which was already retrieved from the authentication request. Subsequently, the identity authentication unit 53 performs an identity authentication by comparing the facial feature information derived from the captured image included in the authentication request with the facial feature information derived from the reauthentication request (step S912).

Upon comparing the facial feature information derived from the captured image included in the authentication request with the facial feature information derived from the reauthentication request, the identity authentication unit 534 determines a success of the identity authentication when a matching degree is equal to or above a predetermined threshold value. Upon comparing the facial feature information derived from the captured image included in the authentication request with the facial feature information derived from the reauthentication request, the identity authentication unit 534 determines a failure of the identity authentication when a matching degree is less than the predetermined threshold value.

Upon determining a success of authentication via an identity authentication performed according to the reauthentication request, the authentication apparatus 2 performs a watchlist collation (step S913). The watchlist collation is a process to determine whether the user information identified by the identity authentication is recorded on the watchlist table. Specifically, the second acquisition unit 52 of the authentication apparatus 2 outputs to the inspection unit 54 the facial feature information generated according to the reauthentication request. The inspection unit 54 performs a collation of the facial feature information with the facial feature information registered on the watchlist table via a 1:n collation algorithm, thus determining whether the facial feature information of a person representing facial features of an authentication subject identified from the registrant table is included in the watchlist table. Upon determining that the facial feature information of a person representing facial features of an authentication subject identified from the registrant table is included in the watchlist table, the inspection unit 54 generates conformity information representing conformity to inspection requirements. Upon determining that the facial feature information of a person representing facial features of an authentication subject identified from the registrant table is not included in the watchlist table, the inspection unit 54 generates nonconformity information representing nonconformity to inspection requirements. The communication unit 55 of the authentication apparatus 2 transmits to the inspection-gate apparatus 1 the information representing a result of authentication via an identity authentication (e.g., a success of authentication or a failure of authentication) and the information representing a result of inspection via a watchlist collation (e.g., conformity information representing conformity to inspection requirements or nonconformity information representing nonconformity to inspection requirements) (step S914).

According to the aforementioned process, when an identity authentication cannot be performed according to a first authentication request and when an authentication subject does not wear an outfitting such as a mask on his/her face, the information processing system 100 performs an identity authentication using the facial feature information which is generated using the captured image of an authentication subject. When an authentication subject wears an outfitting such as a mask on his/her face, the information processing system 100 may reacquire a captured image of an authentication subject taking off an outfitting such as mask according to a retransmission request of captured images, thus performing an identity authentication using the facial feature information which is generated using the captured image of an authentication subject. Accordingly, it is possible to provide a system configured to request an authentication subject to take off its outfitting such as a mask only when it is required to take off an outfitting such as a mask. According to the aforementioned process, it is possible to reduce a degree of transmitting viruses via hands since users do not need to directly touch the inspection-gate apparatus 1.

Other Exemplary Embodiments

It is possible to modify the aforementioned processes such that the inspection-gate apparatus 1 may acquire a variety of noncontact information such as noncontact fingerprint information, iris information, and facial images as relevant information related to the newest authentication subject, thus registering the relevant information in the authentication apparatus 2 or another database.

It is possible to modify the aforementioned processes such that the inspection-gate apparatus 1 may reacquire either noncontact fingerprint information or fingerprint impression information of an authentication subject so as to register the reacquired information in the authentication apparatus 2 or another database when a watchlist collation process determines nonconformity to inspection requirements.

The foregoing exemplary embodiments refers to a person as an example of an authentication subject, however, it is possible to define an authentication subject as other animals.

<Minimum Configuration>

Figure 14:
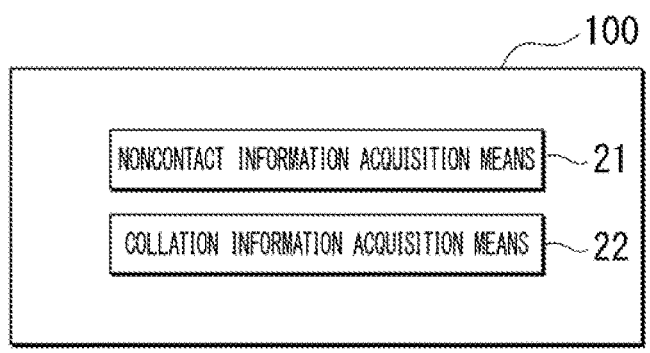
FIG. 14 is a block diagram showing the minimum configuration of an information processing system in this disclosure.

FIG. 14 is a block diagram showing a minimum configuration of an information processing system.

Figure 15:
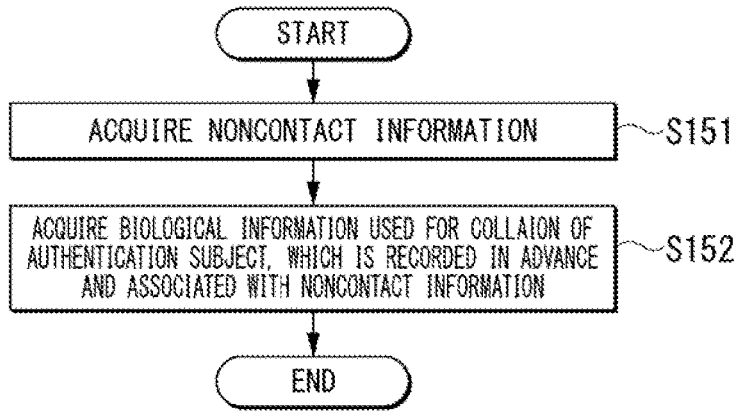
FIG. 15 is a flowchart showing a flow of processing of the information processing apparatus having the minimum configuration in this disclosure.

FIG. 15 is a flowchart showing a flow of processing of the information processing system having the minimum configuration.

The information processing system includes a noncontact information acquisition means 21 and a collation information acquisition means 22.

The noncontact information acquisition means 21 is configured to acquire noncontact information indicating either the iris information or the noncontact fingerprint information of an authentication subject (step S151).

The collation information acquisition means 22 is configured to acquire biological information used for a collation of an authentication subject which is recorded in advance and associated with the noncontact information (step S152).

Heretofore, the foregoing exemplary embodiments have been described in detail with reference to the accompanying drawings, whereas concrete configurations are not necessarily limited to the foregoing exemplary embodiments: hence, the present invention may include any design change without departing from the subject matter of this disclosure.

The aforementioned devices according to the foregoing exemplary embodiments may include computer systems therein. The aforementioned processes are stored on computer-readable storage media in the form of programs; hence, it is possible to achieve the aforementioned processes by reading and executing programs from storage media. Herein, computer-readable storage media refer to magnetic disks, magneto-optical disks, CD-ROM, DVD-ROM, semiconductor memory, and the like. In addition, it is possible to deliver computer programs to computers through communication lines, and therefore computers receiving programs delivered thereto may execute programs.

The aforementioned programs may embody some of the foregoing functions. Moreover, programs may be differential files (or differential programs) for achieving the foregoing functions when combined with pre-stored programs of computer systems.

REFERENCE SIGNS LIST

1 . . . inspection-gate apparatus
2 . . . authentication apparatus
41 . . . control unit
42 . . . passport processing unit
43 . . . first acquisition unit
44 . . . inspection management unit
45 . . . communication unit
51 . . . control unit
52 . . . second acquisition unit
53 . . . identity authentication unit
54 . . . inspection unit
55 . . . communication unit

What is claimed is:

1. An information processing system comprising:
at least one memory configured to store instructions; and
at least one processor configured to execute the instructions to:
  acquire noncontact information indicating at least one of noncontact fingerprint information and iris information of an authentication subject;
  to acquire biological information used for a collation of the authentication subject, which is recorded in advance and associated with the noncontact information;
  perform an authentication for verifying the authentication subject using the noncontact information;
  perform the collation using the biological information as to whether relevant information related to the authentication subject is registered; and
  acquire a facial image of the authentication subject to determine whether the authentication subject wears an outfitting on a face represented by the facial image thereof,
wherein the collation is performed using the biological information representing facial feature information of the face of the authentication subject associated with the noncontact information when it is determined that the authentication subject wears the outfitting on the face represented by the facial image thereof and when at least the noncontact information of the authentication subject is recorded in advance.

2. The information processing system according to claim 1, wherein the at least one processor is further configured to execute the instructions to acquire as the noncontact information the noncontact fingerprint information which is detected in an noncontact manner, and to acquire as the biological information fingerprint impression information of the authentication subject which is recorded in advance and associated with the noncontact fingerprint information.

3. The information processing system according to claim 1, wherein the at least one processor is further configured to execute the instructions to acquire the iris information as the noncontact information detected in the noncontact manner, and to acquire as the biological information fingerprint impression information of the authentication subject which is recorded in advance and associated with the iris information.

4. The information processing system according to claim 1, wherein the facial feature information associated with the noncontact information corresponds to facial feature information of the authentication subject which does not wear the outfitting on the face thereof.

5. The information processing system according to claim 1, wherein the at least one processor is further configured to execute the instructions to perform the collation representing facial feature information of a face newly retrieved from a new facial image of the authentication subject newly captured when it is determined that the authentication subject wears the outfitting on the face represented by the facial image thereof and when the noncontact information of the authentication subject is not recorded in advance.

6. The information processing system according to claim 5, wherein the at least one processor is further configured to execute the instructions to transmit a retransmission request of a captured image for newly capturing the new facial image of the authentication subject when it is determined that the authentication subject wears the outfitting on the face represented by the facial image thereof and when the noncontact information of the authentication subject is not recorded in advance.

7. An information processing method comprising:

acquiring noncontact information indicating at least one of noncontact fingerprint information and iris information of an authentication subject;

acquiring biological information used for a collation of the authentication subject, which is recorded in advance and associated with the noncontact information;

performing an authentication for verifying the authentication subject using the noncontact information;

performing the collation using the biological information as to whether relevant information related to the authentication subject is registered; and acquiring a facial image of the authentication subject to determine whether the authentication subject wears an outfitting on a face represented by the facial image thereof, wherein the collation is performed using the biological information representing facial feature information of the face of the authentication subject associated with the noncontact information when it is determined that the authentication subject wears the outfitting on the face represented by the facial image thereof and when at least the noncontact information of the authentication subject is recorded in advance.

8. A non-transitory computer-readable storage medium for storing a program causing a computer of an information processing system to implement:

acquiring noncontact information indicating at least one of noncontact fingerprint information and iris information of an authentication subject;

acquiring biological information used for a collation of the authentication subject, which is recorded in advance and associated with the noncontact information;

performing an authentication for verifying the authentication subject using the noncontact information;

performing the collation using the biological information as to whether relevant information related to the authentication subject is registered; and acquiring a facial image of the authentication subject to determine whether the authentication subject wears an outfitting on a face represented by the facial image thereof, wherein the collation is performed using the biological information representing facial feature information of the face of the authentication subject associated with the noncontact information when it is determined that the authentication subject wears the outfitting on the face represented by the facial image thereof and when at least the noncontact information of the authentication subject is recorded in advance.

* * * * *